United States Patent
Kamakura

(10) Patent No.: US 12,399,375 B2
(45) Date of Patent: Aug. 26, 2025

(54) WEARABLE IMAGE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 517 days.

(21) Appl. No.: 17/879,507

(22) Filed: Aug. 2, 2022

(65) Prior Publication Data
US 2023/0040647 A1    Feb. 9, 2023

(30) Foreign Application Priority Data
Aug. 3, 2021    (JP) .................. 2021-127767

(51) Int. Cl.
G02B 27/01    (2006.01)

(52) U.S. Cl.
CPC .. G02B 27/0176 (2013.01); *G02B 2027/0159* (2013.01); *G02B 2027/0178* (2013.01)

(58) Field of Classification Search
None
See application file for complete search history.

(56) References Cited

U.S. PATENT DOCUMENTS

| | | |
|---|---|---|
| 10,369,798 B2 | 8/2019 | Mori |
| 11,194,165 B2 | 12/2021 | Kamakura |
| 2018/0201020 A1 | 7/2018 | Mori |
| 2020/0371365 A1 | 11/2020 | Kamakura |
| 2022/0197038 A1 | 6/2022 | Yoshida |
| 2023/0120469 A1* | 4/2023 | Tang ............... G02B 27/0172 345/633 |

FOREIGN PATENT DOCUMENTS

| | | |
|---|---|---|
| CN | 107409189 A | 11/2017 |
| CN | 111983807 A | 11/2020 |
| JP | 2013-214910 A | 10/2013 |
| WO | 2020/241283 A1 | 12/2020 |

\* cited by examiner

*Primary Examiner* — Toan Ton
*Assistant Examiner* — Danell L Owens
(74) *Attorney, Agent, or Firm* — Oliff PLC

(57) ABSTRACT

A wearable image display device includes a display unit that displays an image and a wearing unit attached to the display unit. The display unit includes a first positioning portion and a first rotation mechanism that rotates relative to the wearing unit in a rotational direction with a first direction serving as a rotation axis. The wearing unit includes a second positioning portion brought into contact with the first positioning portion and a first fitting mechanism fitted to the first rotation mechanism. The first positioning portion and the second positioning portion are brought into contact with each other either at a first position or at a second position different from the first position in the rotational direction.

8 Claims, 16 Drawing Sheets

WEARABLE IMAGE DISPLAY DEVICE

The present application is based on, and claims priority from JP Application Serial Number 2021-127767, filed Aug. 3, 2021, the disclosure of which is hereby incorporated by reference herein in its entirety.

BACKGROUND

1. Technical Field

The present disclosure relates to a wearable image display device that presents a virtual image to a wearer. In particular, the present disclosure relates to a wearable image display device capable of adjusting a wearing position or a display position of the virtual image.

2. Related Art

As a wearable image display device, one that includes a base unit having a pair of temple members and a movable unit having a pair of display units is known, wherein the base unit includes a pair of hinges that rotatably support the temple members, and the movable unit is rotatably journaled by the base unit with a pair of movable portions attached in the vicinity of the pair of hinges serving as fulcrums, and can be raised and lowered in front of the eyes (JP-A-2013-214910).

The device of JP-A-2013-214910 has a structure in which the operation portion provided at the center of the movable unit is bent to reduce frictional resistance of the sliding surface and thereby facilitate vertical position adjustment. Thus, even when the movable unit is stable at the lower end position, the movable unit may not be stable at upper positions, so the display unit may be displaced from the position suitable for the wearer's eyes.

SUMMARY

A wearable image display device according to one aspect of the present disclosure includes: a display unit that displays an image, and a wearing unit attached to the display unit, wherein the display unit includes a first positioning portion and a first rotation mechanism that rotates relative to the wearing unit in a rotational direction with a first direction serving as a rotation axis, the wearing unit includes a second positioning portion brought into contact with the first positioning portion and a first fitting mechanism fitted to the first rotation mechanism, and the first positioning portion and the second positioning portion are brought into contact with each other either at a first position or at a second position different from the first position in the rotational direction.

DESCRIPTION OF EXEMPLARY EMBODIMENTS

First Embodiment

Hereinafter, a first embodiment of a wearable image display device according to the present disclosure will be described with reference to drawings.

Figure 1:
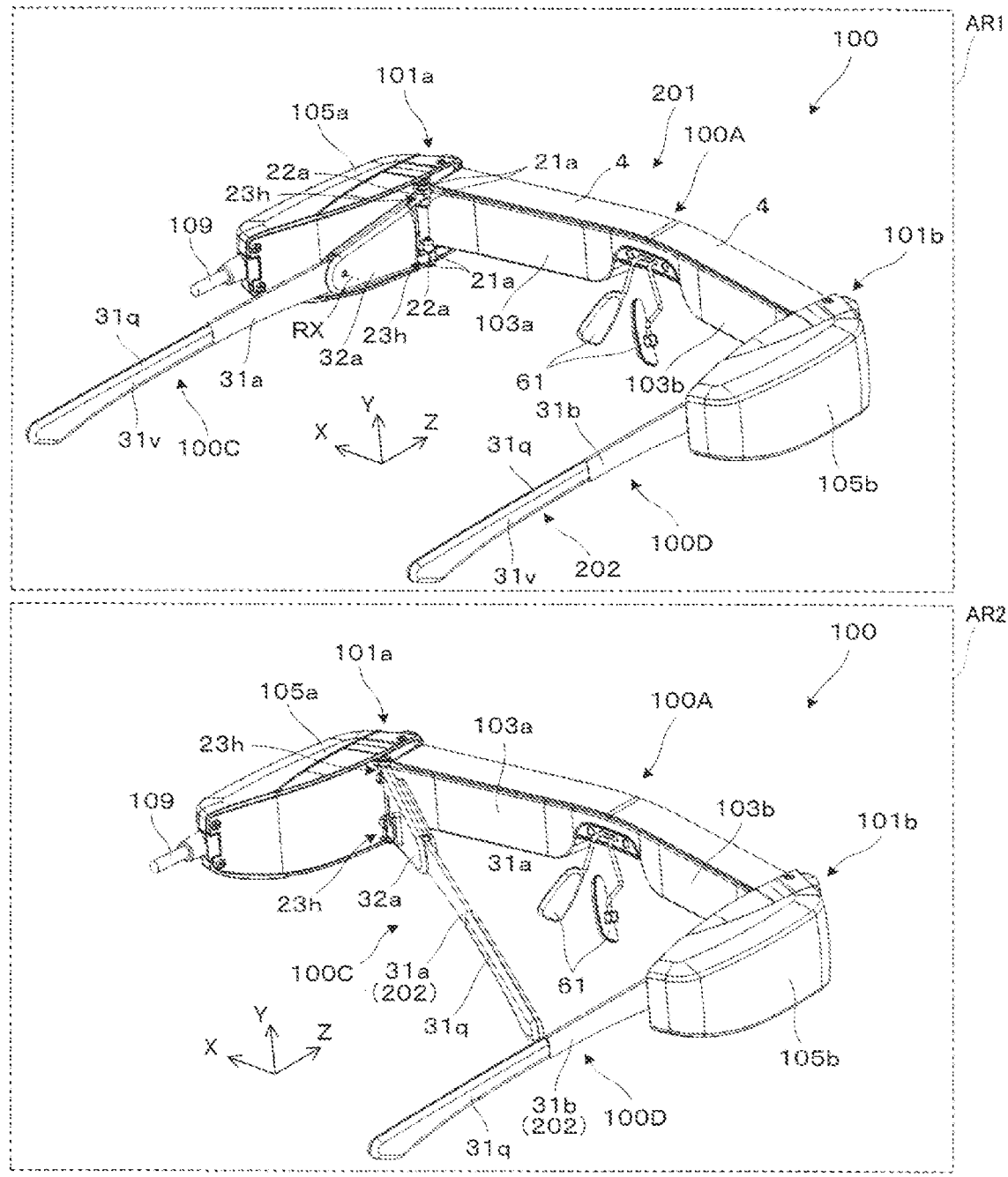
FIG. 1 is a perspective view illustrating a wearable image display device according to a first embodiment.
Figure 2:
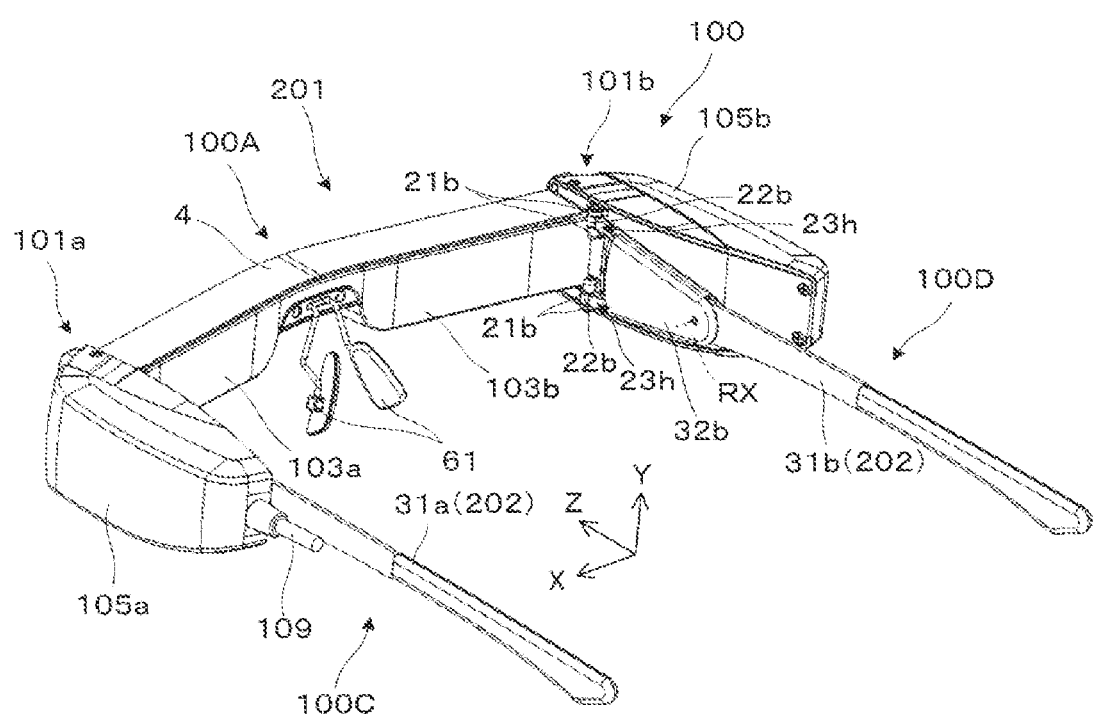
FIG. 2 is a perspective view illustrating a wearable image display device.
Figure 3:
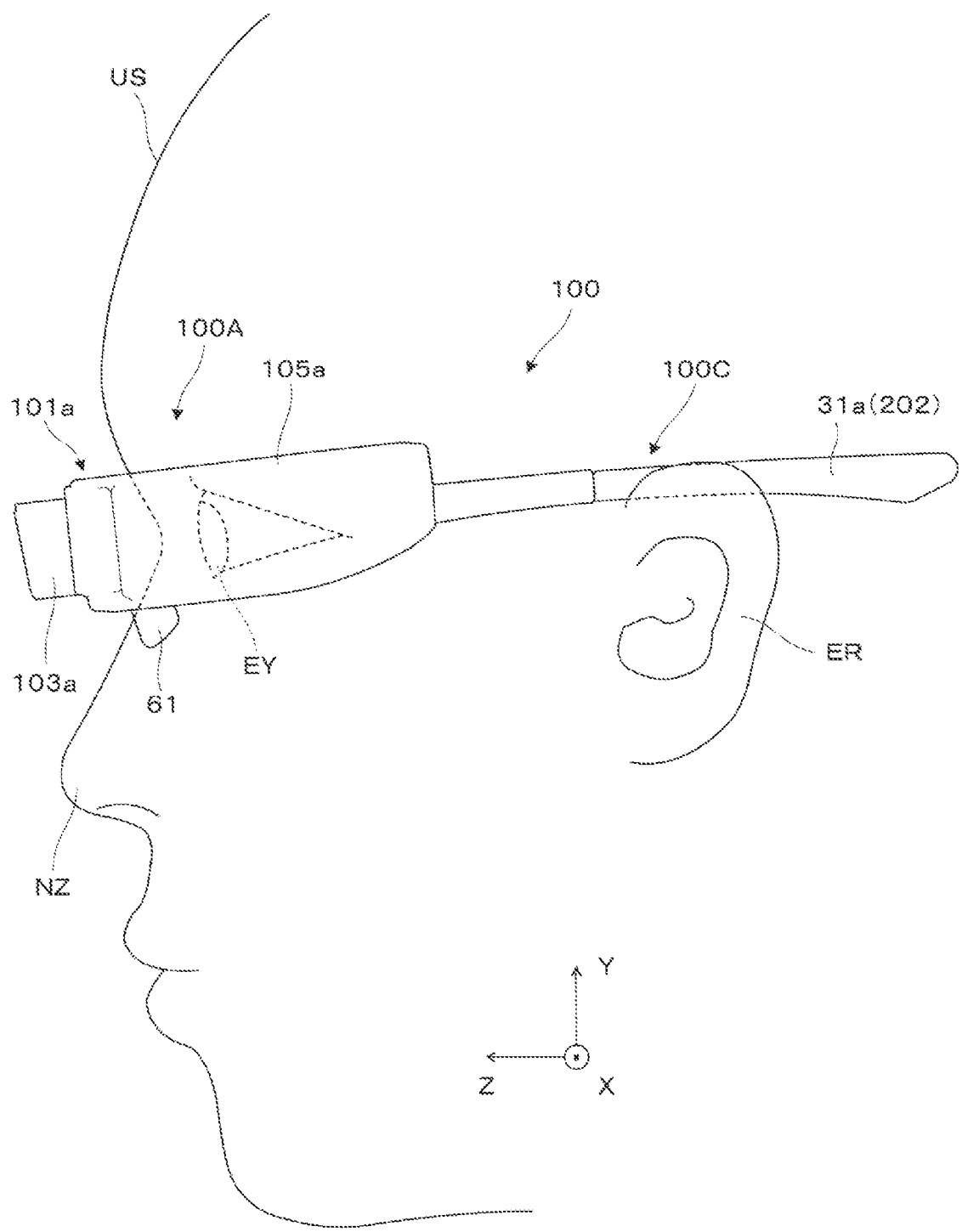
FIG. 3 is a side view illustrating a wearing state of a wearable image display device.

Referring to FIGS. 1 to 3, a head-mounted display (hereinafter also referred to as "HMD") 100 is a wearable image display device, and allows an observer wearing the same or a wearer US to recognize video as a virtual image. In FIG. 1 and the like, X, Y, and Z represent an orthogonal coordinate system: the +X direction corresponds to a lateral direction in which the eyes EY of the wearer US wearing the HMD 100 are aligned; the +Y direction corresponds to an upward direction orthogonal to the lateral direction in which the eyes EY are aligned for the wearer US; and the +Z direction corresponds to a forward direction or a front direction for the wearer US. The ±Y direction is parallel to the vertical axis or the vertical direction. In FIG. 1, the first region AR1 is a perspective view of the HMD 100 corresponding to the wearing state, and the second region AR2 is a perspective view illustrating the collapsing operation of a first temple 100C.

The HMD 100 allows the wearer US wearing the same not only to visually recognize the virtual image, but also to observe the outside world image in a see-through manner. The HMD 100 can be communicably coupled to an external device (not illustrated) that is a smartphone or the like via a cable 109, and can form a virtual image corresponding to the video signal input from such an external device.

The HMD 100 includes, as structural elements, a display device 100A that forms a virtual image, the first temple 100C that supports the display device 100A, and a second temple 100D that supports the display device 100A. In this case, the center of the display device 100A is supported by the nose NZ of the wearer US via a nose pad 61, with both ends of the display device 100A supported by the ears ER of the wearer US via the first temple 100C and the second temple 100D. As a result, the HMD 100 is stably supported on the head of the wearer US.

The display device 100A includes a first image-forming device 100a and a second image-forming device 100b. The first image-forming device 101a and the second image-forming device 101b are portions that form a virtual image for the left eye and a virtual image for the right eye, respectively. The first image-forming device 101a for the left eye includes a first virtual image-forming optical unit 103a that covers the front of the wearer US in a see-through manner, and a first image-forming main body portion 105a that forms image light. The second image-forming device 101b for the right eye includes a second virtual image-forming optical unit 103b that covers the front of the wearer US in a see-through manner, and a second image-forming main body portion 105b that forms image light. The virtual image-forming optical units 103a and 103b include a light guide formed of a resin material or the like. In the image-forming main body portions 105a and 105b, an optical component or an electronic component is housed in an outer case 105d formed of a magnesium alloy or the like. Bearing members 21a are provided in the outer case 105d as components constituting a hinge 23h to be described later.

The first temple 100C on the left side is rotatably supported by a pair of hinges 23h each including a shaft cylinder member 22a formed on the root side of the first temple 100C, a pair of bearing members 21a fixed to the outer case 105d, and a core rod (not illustrated) passed through the shaft cylinder member 22a and the bearing members 21a. The pair of hinges 23h are provided spaced apart from each other in the Y direction, which is the vertical direction. The pair of hinges 23h make the first temple 100C collapsible to the inner side where the head of the wearer US is to be located. Rotating the first temple 100C to such a position as to extend substantially parallel to the display device 100A causes the first temple 100C to be stored behind the display device 100A.

The second temple 100D on the right side is rotatably supported by a pair of hinges 23h each including a shaft cylinder member 22b formed on the root side of the second temple 100D, a pair of bearing members 21b fixed to the outer case 105d, and a core rod (not illustrated) passed through the shaft cylinder member 22b and the bearing members 21b. The pair of hinges 23h are provided spaced apart from each other in the Y direction, which is the vertical direction. The pair of hinges 23h make the second temple 100D collapsible to the inner side where the head of the wearer US is to be located. Rotating the second temple 100D to such a position as to extend substantially parallel to the display device 100A causes the second temple 100D to be stored behind the display device 100A.

The first temple 100C includes a rod-shaped first extending member 31a having an elongated thin plate portion, and a first support member 32a having a triangular plate shape. Furthermore, the second temple 100D includes a rod-shaped second extending member 31b having an elongated thin plate portion, and a second support member 32b having a triangular plate shape. The first support member 32a is rotatably fixed to the first image-forming main body portion 105a constituting the display device 100A via the pair of hinges 23h. The second support member 32b is rotatably fixed to the second image-forming main body portion 105b constituting the display device 100A via the pair of hinges 23h. The display device 100A combined with the first support member 32a and the second support member 32b is referred to as a display unit 201. Furthermore, the first extending member 31a and the second extending member 31b attached to the display unit 201 are referred to as a wearing unit 202.

In the first temple 100C, when the first temple 100C is expanded to the wearing state, the first extending member 31a is capable of rotating, relative to the first support member 32a or the display unit 201, in a rotational direction about a rotation axis RX that is parallel to the X direction in which the eyes EY are aligned and that corresponds to the first direction. In the second temple 100D, when the second temple 100D is expanded to the wearing state, the second extending member 31b is capable of rotating, relative to the second support member 32b or the display unit 201, in a rotational direction about the rotation axis RX that is parallel to the X direction in which the eyes EY are aligned and that corresponds to the first direction.

Figure 4:
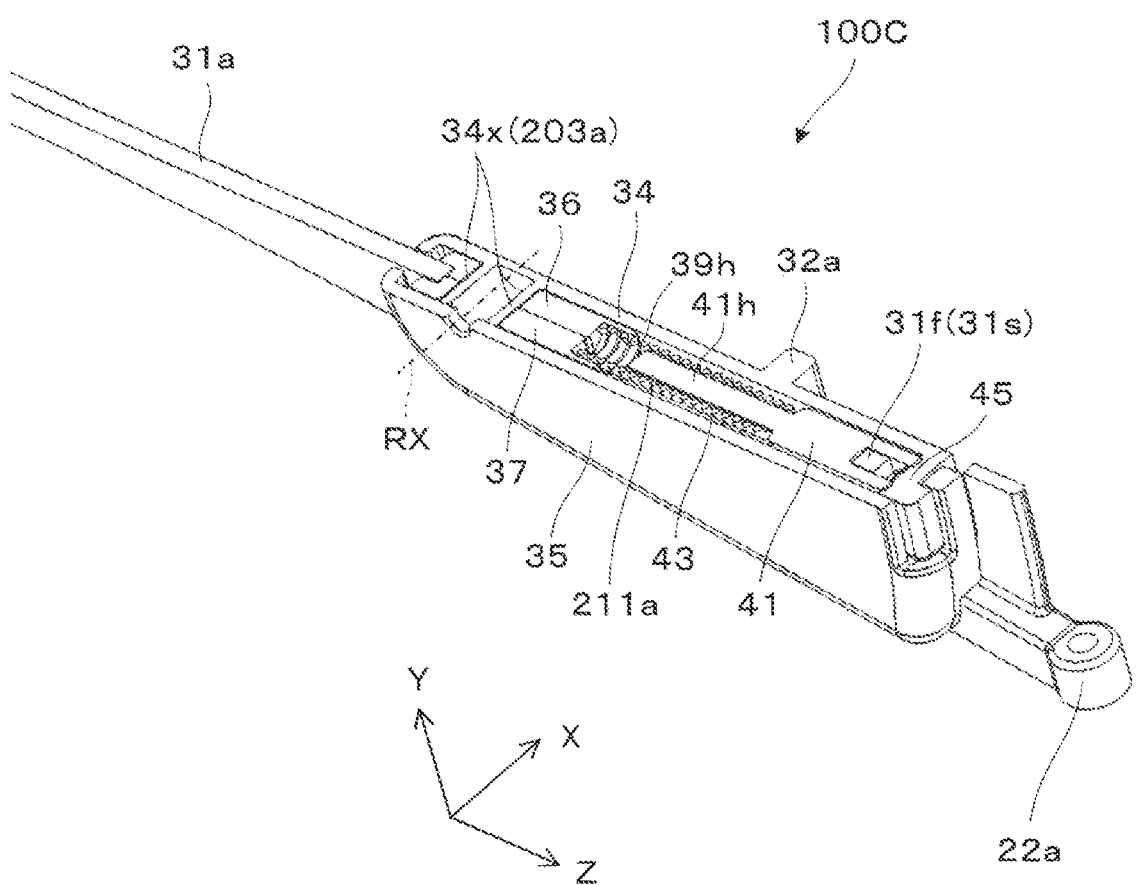
FIG. 4 is a partially cutaway perspective view of a first temple.
Figure 5:
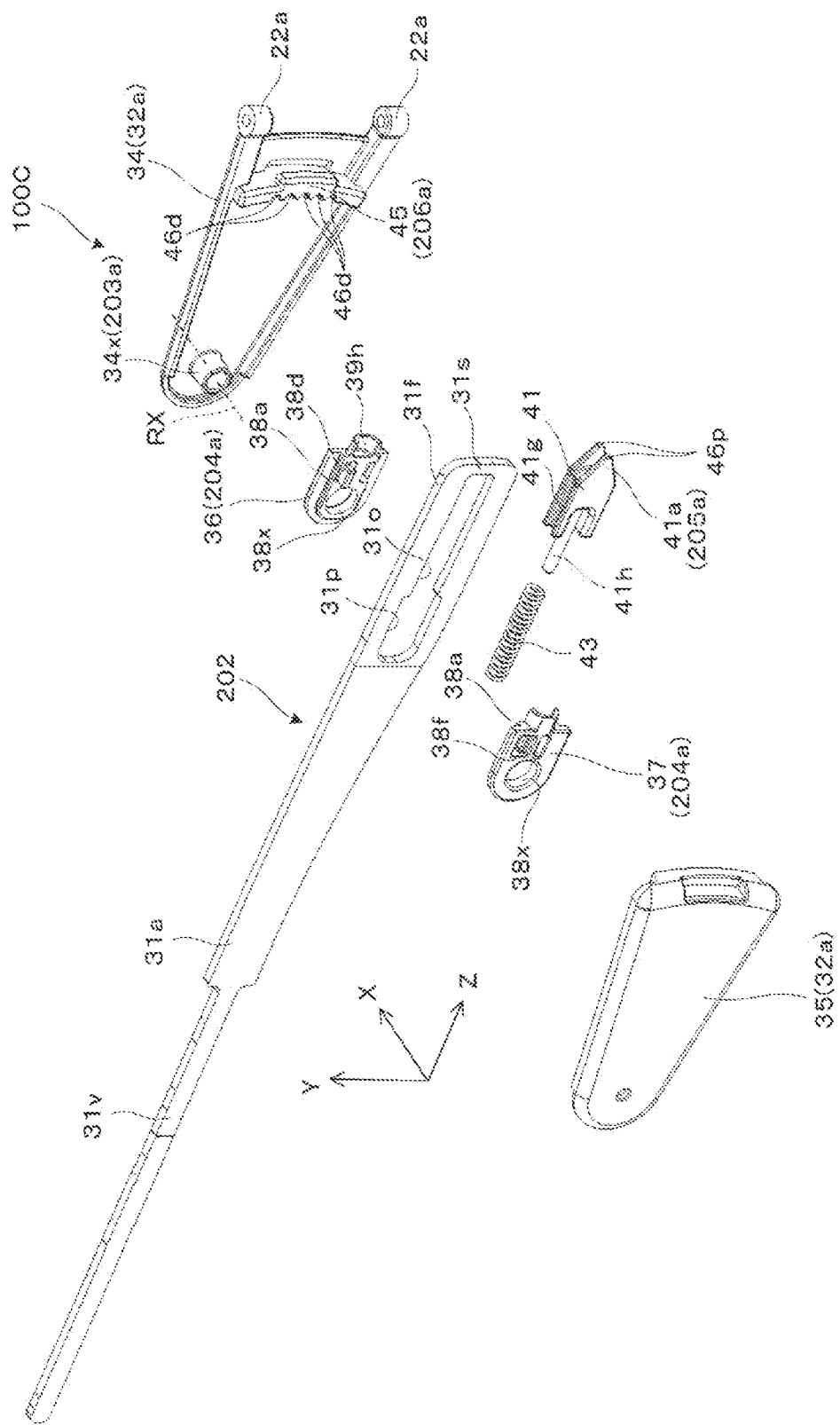
FIG. 5 is an exploded perspective view of the first temple.

FIG. 4 is a partially cutaway perspective view illustrating a cross section parallel to the XZ plane of the first temple 100C. FIG. 5 is an exploded perspective view of the first temple 100C. The first support member 32a has a thin extending case shape, is formed of resin or the like, and houses the tip portion 31f of the first extending member 31a. The first support member 32a includes a first member 34 disposed on the outer +X side, and a second member 35 disposed on the inner −X side. The first extending member 31a is a rod-shaped member, and is formed of a metal or the like. A pair of bearing members 36 and 37, a sliding member 41, and a spring 43 that is an elastic member enclosed thereby, are attached to the tip portion 31f of the first extending member 31a. One end of the spring 43 is held by a hole 39h formed by the bearing members 36 and 37. The other end of the spring 43 is held by a shaft 41h extending from the sliding member 41. The sliding member 41 has a groove 41g on the upper side and the lower side thereof, respectively. This allows the sliding member 41 to move back and forth in the ±Z direction within an elongated opening 31o formed at the tip portion 31f of the first extending member 31a. Here, the sliding member 41 is a positioning member, and the spring 43 is an elastic member. In other words, in the first extending member 31a, the sliding member 41 that is a positioning member and the spring 43 that is an elastic member are provided, in addition to the bearing members 36 and 37, in an opening portion 211a including the opening 31o. The sliding member 41 is biased toward the tip +Z side by the spring 43. However, a stopper 31s at the tip portion 31f of the first extending member 31a restricts the sliding member 41 from moving toward the +Z side by not less than a predetermined amount. The sliding member 41 can be retracted to the −Z side against the spring force. The rear portion 31v of the first extending member 31a has some flexibility, and is covered by a soft cover 31q made of resin (see FIG. 1).

The first member 34 of the first support member 32a houses the tip portion 31f of the first extending member 31a so as to support the same from the outside, that is, from the +X side. The second member 35 houses the tip portion 31f of the first extending member 31a so as to hold the same from the inside, that is, from the −X side. A shaft portion 34x extending along the rotation axis RX is formed on the inner space side of the first member 34. At the tip portion 31f of the first extending member 31a, the elongated opening 31o is formed, and the pair of bearing members 36 and 37 are attached so as to sandwich a widened portion 31p provided on the rear end side, that is, on the −Z side of the opening 31o. At this time, a protrusion 38a formed on the pair of bearing members 36 and 37 are fitted to the widened portion 31p, and the pair of bearing members 36 and 37 are fixed to each other by utilizing a pawl 38d and an opening 38f formed therein. Thus, the bearing members 36 and 37 are integrally fixed to the widened portion 31p, that is, the first extending member 31a. A shaft hole 38x is formed in the pair of bearing members 36 and 37. The shaft portion 34x of the first support member 32a is inserted into the shaft hole 38x. Here, the shaft portion 34x functions as a first rotation mechanism 203a that allows rotation of the first extending member 31a relative to the display unit 201, that is, rotation of the display unit 201 relative to the first extending member 31a or the wearing unit 202. Furthermore, the bearing members 36 and 37 function as a first fitting mechanism 204a fitted to the shaft portion 34x, which is the first rotation mechanism 203a. In other words, the first rotation mechanism 203a and the first fitting mechanism 204a make the first extending member 31a rotatable relative to the first support member 32a about the rotation axis RX corresponding to the first direction.

A ratchet tooth member 45 is formed on the inner surface on the tip side, that is, on the +Z side of the first member 34 of the first support member 32a along an arc about the shaft portion 34x. Five recesses 46d are formed in the ratchet tooth member 45. A protrusion 46p of a ratchet pawl 41a formed in the sliding member 41 incorporated into the first extending member 31a engages with a recess 46d. Applying a rotational force greater than or equal to a predetermined magnitude to the first extending member 31a to rotate the first extending member 31a about the rotation axis RX relative to the first support member 32a causes the protrusion 46p of the ratchet pawl 41a to move in a stepwise manner while being fitted to recesses 46d along the ratchet tooth member 45. This causes the angular posture of the first extending member 31a relative to the first support member 32a to change in units of 4°, for example, with the initial standard state being 0°. Specifically, the angular posture of the first extending member 31a can be −8°, −4°, 0°, +4°, or +8°. In the above description, the ratchet pawl 41a is a first positioning portion 205a, which is one member for adjusting the angle of the first extending member 31a relative to the first support member 32a. The ratchet pawl 41a is provided with a protrusion 46p, which is brought into contact with any of a plurality of recesses 46d of the ratchet tooth member 45. Furthermore, the ratchet tooth member 45 is a second positioning portion 206a, which is the other member for adjusting the angle of the first extending member 31a relative to the first support member 32a. The protrusion 46p of the ratchet pawl 41a is brought into contact with any of the plurality of recesses 46d. Note that the protrusion 46p of the ratchet pawl 41a is separated into two portions in the lateral X direction, with the stopper 31s of the first extending member 31a being disposed in a groove formed therebetween.

Figure 6:
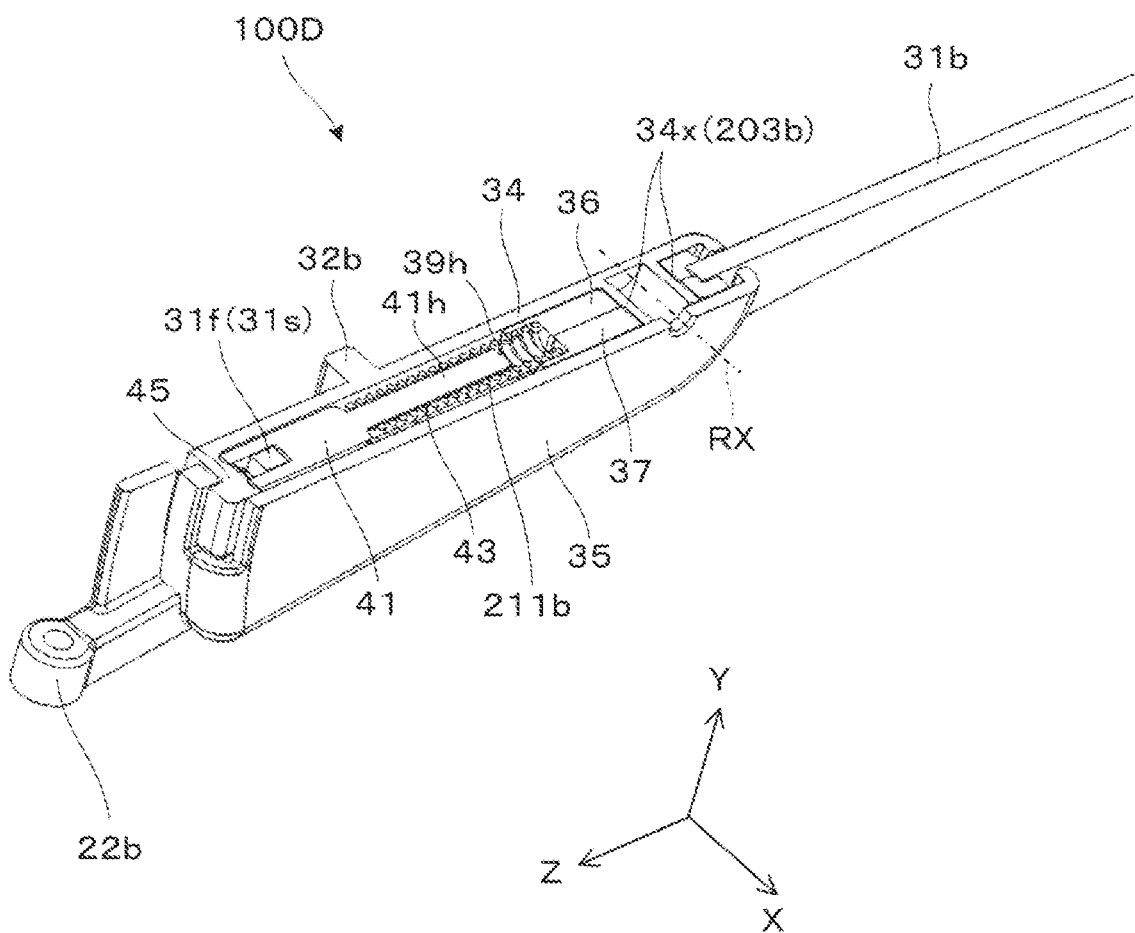
FIG. 6 is a partially cutaway perspective view of a second temple.
Figure 7:
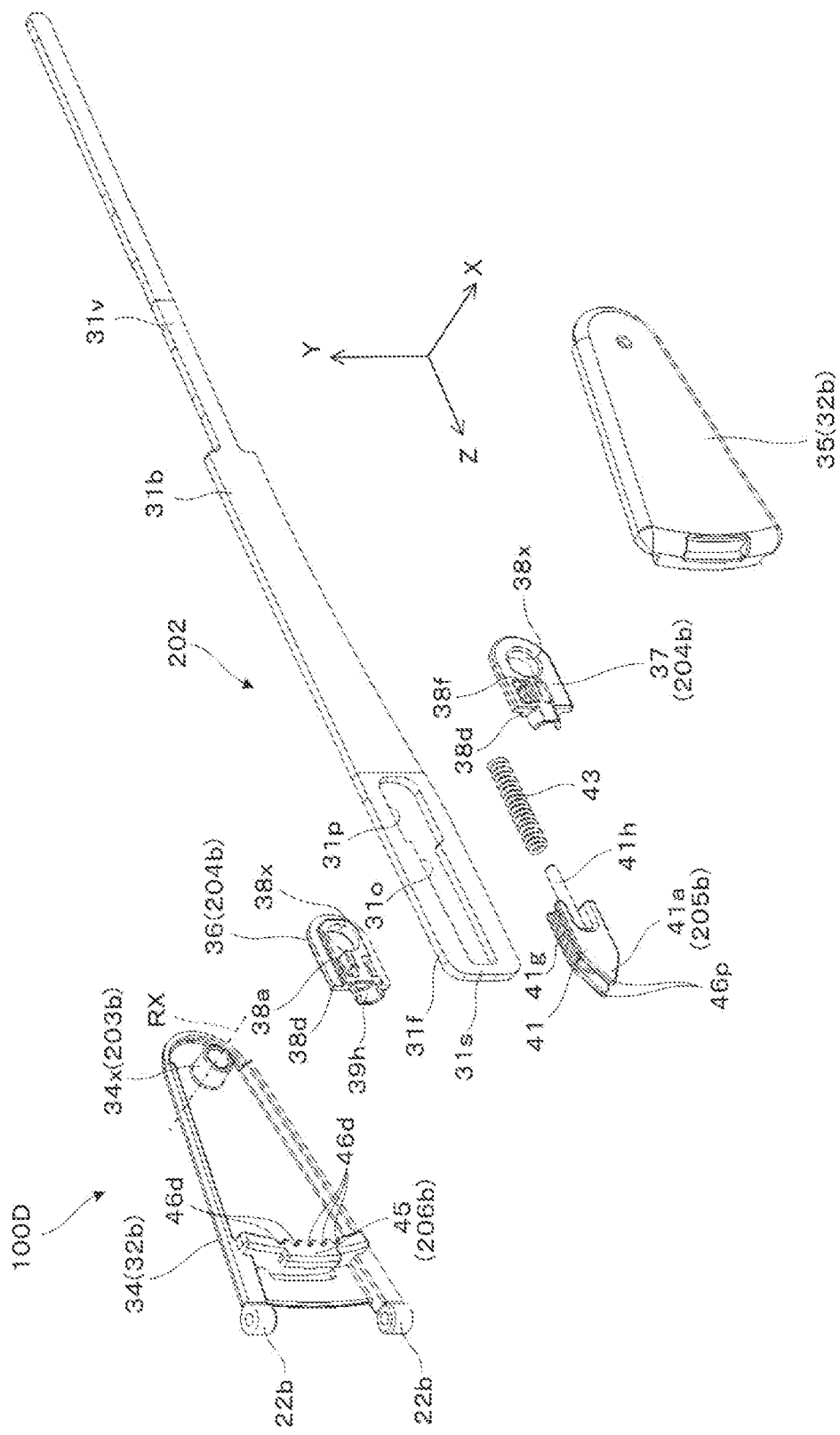
FIG. 7 is an exploded perspective view of the second temple.

FIG. 6 is a partially cutaway perspective view illustrating a cross section parallel to the XZ plane of the second temple 100D. FIG. 7 is an exploded perspective view of the second temple 100D. The second support member 32b has a thin extending case shape and houses the tip portion 31f of the second extending member 31b. The second support member 32b includes a first member 34 disposed on the outer −X side, and a second member 35 disposed on the inner +X side. A pair of bearing members 36 and 37, a sliding member 41, and a spring 43 enclosed thereby are attached to the tip portion 31f of the second extending member 31b. One end of the spring 43 is held by a hole 39h formed by the bearing members 36 and 37. The other end of the spring 43 is held by a shaft 41h extending from the sliding member 41. The sliding member 41 has a groove 41g on the upper side and the lower side, respectively. This allows the sliding member 41 to be move back and forth in the ±Z direction within an elongated opening 31o formed at the tip portion 31f of the first extending member 31a. Here, the sliding member 41 is a positioning member, and the spring 43 is an elastic member. In other words, in the second extending member 31b, the sliding member 41 that is a positioning member and the spring 43 that is an elastic member are provided, in addition to the bearing members 36 and 37, in an opening portion 211b including the opening 31o. The sliding member 41 is biased toward the tip +Z side by the spring 43. However, a stopper 31s at the tip portion 31f of the first extending member 31a restricts the sliding member 41 from moving toward the +Z side by not less than a predetermined amount. The sliding member 41 can be retracted to the −Z side against the spring force.

The first member 34 of the second support member 32b houses the tip portion 31f of the second extending member 31b so as to support the same from the outside, that is, from the −X side. The second member 35 houses the tip portion 31f of the second extending member 31b so as to hold the same from the inside, that is, from the +X side. A shaft portion 34x extending along the rotation axis RX is formed on the inner space side of the first member 34. At the tip portion 31f of the second extending member 31a, the elongated opening 31o is formed, and the pair of bearing members 36 and 37 are attached so as to sandwich a widened portion 31p provided on the rear end side, that is, on the −Z side of the opening 31o. At this time, a protrusion 38a formed on the pair of bearing members 36 and 37 are fitted to the widened portion 31p, and the pair of bearing members 36 and 37 are fixed to each other by utilizing a pawl 38d and an opening 38f formed therein. Thus, the bearing members 36 and 37 are integrally fixed to the widened portion 31p, that is, the second extending member 31b. A shaft hole 38x is formed in the pair of bearing members 36 and 37. The shaft portion 34x of the second support member 32b is inserted into the shaft hole 38x. Here, the shaft portion 34x functions as a second rotation mechanism 203b that allows rotation of the second extending member 31b relative to the display unit 201, that is, rotation of the display unit 201 relative to the second extending member 31b or the wearing unit 202. Furthermore, the bearing members 36 and 37 function as a second fitting mechanism 204b fitted to the shaft portion 34x, which is the second rotation mechanism 203b. In other words, the second rotation mechanism 203b and the second fitting mechanism 204b make the second extending member 31b rotatable relative to the second support member 32b about the rotation axis RX corresponding to the first direction.

A ratchet tooth member 45 is formed on the inner surface on the tip side, that is, on the +Z side of the first member 34 of the second support member 32b along an arc about the shaft portion 34x. Five recesses 46d are formed in the ratchet tooth member 45. A protrusion 46p of a ratchet pawl 41a formed in the sliding member 41 incorporated into the second extending member 31b engages with a recess 46d. Applying a rotational force greater than or equal to a predetermined magnitude to the second extending member 31b to rotate the second extending member 31b about the rotation axis RX relative to the second support member 32b causes the protrusion 46p of the ratchet pawl 41a to move in a stepwise manner while being fitted to recesses 46d along the ratchet tooth member 45. This causes the angular posture of the second extending member 31b relative to the second support member 32b to change in units of 4°, for example, with the initial standard state being 0°. Specifically, the angular posture of the second extending member 31b can be −8°, −4°, 0°, +4°, or +8°. In the above description, the ratchet pawl 41a is a third positioning portion 205b, which is one member for adjusting the angle of the second extending member 31b relative to the second support member 32b. The ratchet pawl 41a is provided with a protrusion 46p, which is brought into contact with any of a plurality of recesses 46d of the ratchet tooth member 45. Furthermore, the ratchet tooth member 45 is a fourth positioning portion 206b, which is the other member for adjusting the angle of the second extending member 31b relative to the second support member 32b. The protrusion 46p of the ratchet pawl 41a is brought into contact with any of the plurality of recesses 46d.

Figure 8:
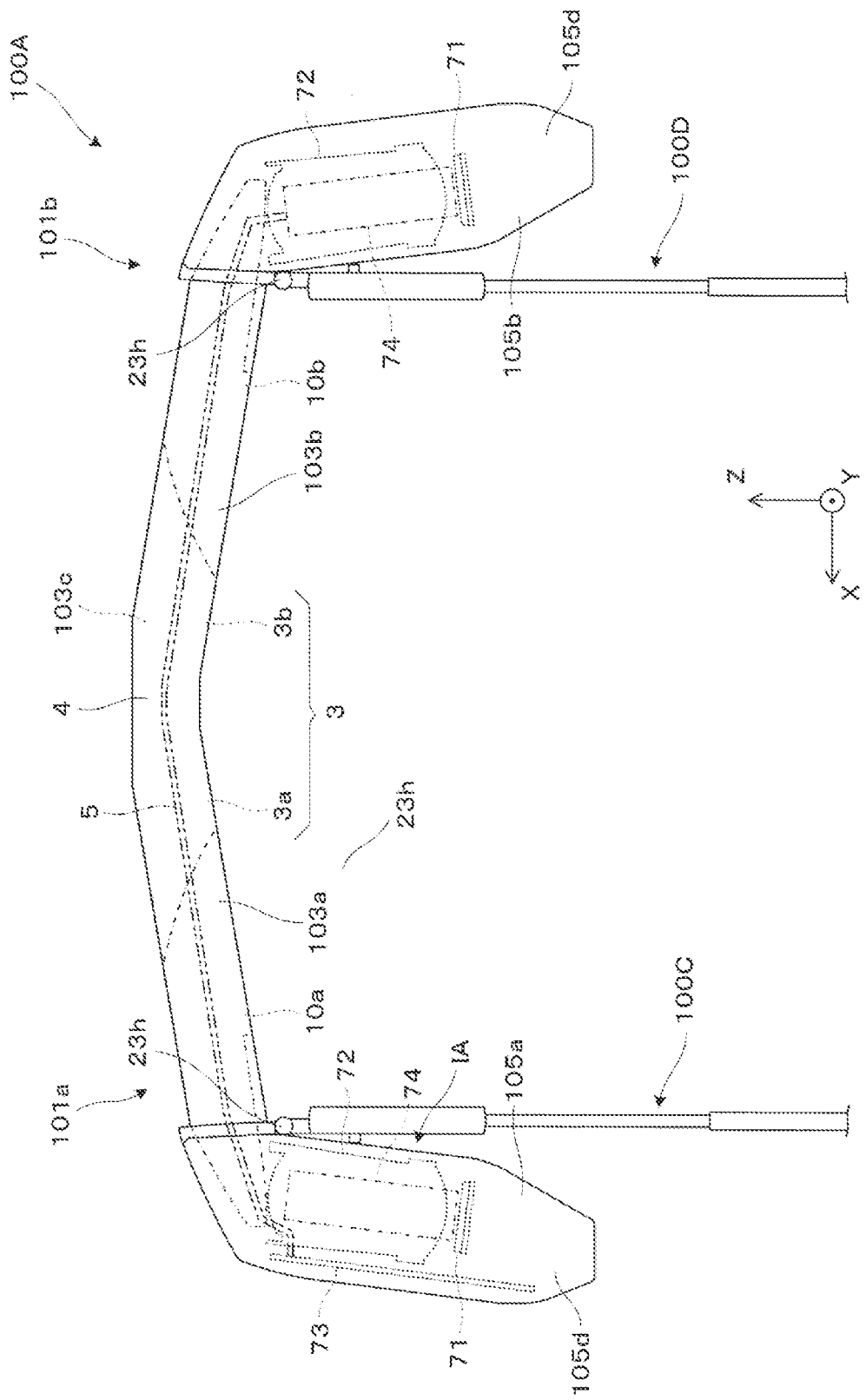
FIG. 8 is a plan view illustrating an optical device of a wearable image display device.

An internal structure and the like of the first image-forming device 101a and the second image-forming device 101b constituting the display device 100A will be described with reference to FIG. 8. The first image-forming main body portion 105a for the left eye holds a display element 71, a projection lens 72, a first electronic printed wired board 73, a second electronic printed wired board 74, and the like in an outer case 105d that has a cover shape and that is made of a metal. The display element 71 and the projection lens 72 are fixed in the outer case 105d in a state of being aligned. In particular, the projection lens 72 is fixed in a state of being also aligned with the tip portion of the first virtual image-forming optical unit 103a. The first electronic printed wired board 73 has a function of interfacing with an external device (not illustrated). The first electronic printed wired board 73 also manages and controls the display operation of the second electronic printed wired board 74. The second electronic printed wired board 74 is a driving printed wired board that drives the display element 71 in the first image-forming main body portion 105a. The second electronic printed wired board 74 operates under the control of the first electronic printed wired board 73.

The second image-forming main body portion 105b for the right eye holds a display element 71, a projection lens 72, a second electronic printed wired board 74, and the like in an outer case 105d. The display element 71 and the projection lens 72 are fixed in the outer case 105d in a state of being aligned. In particular, the projection lens 72 is fixed in a state of being also aligned with the tip portion of the second virtual image-forming optical unit 103b. The second electronic printed wired board 74 is a driving printed wired board that drives the display element 71 in the second image-forming main body portion 105b. The second electronic printed wired board 74 operates under the control of the first electronic printed wired board 73 provided in the distant first image-forming main body portion 105a.

The first virtual image-forming optical unit 103a and the second virtual image-forming optical unit 103b are not separate bodies, but are coupled to each other at opposing ends thereof to form a see-through type light-guiding unit 103c that is an integrated member. The see-through type light-guiding unit 103c includes a pair of light-guiding members 10a and 10b that guide image light from the display element 71, and a central member 3 that allows a superimposed view of the outside world image. The pair of light-guiding members 10a and 10b are a pair of optical members that contribute to virtual image formation while allowing image light to propagate therein. The central member 3 includes a pair of light-transmitting portions 3a and 3b. One light-transmitting portion 3a is joined to one light-guiding member 10a. The other light-transmitting portion 3b is joined to the other light-guiding member 10b. The see-through type light-guiding unit 103c is a composite light-guiding device that provides images for both eyes to the wearer US by guiding light. Both ends, that is, the tips of the light-guiding members 10a and 10b are fitted into the outer cases 105d, and are supported by the image-forming main body portions 105a and 105b.

An upper cover 4 is fixed to the upper surface of the see-through type light-guiding unit 103c so as to cover the same. A gap-like space is formed between the upper cover 4 and the see-through type light-guiding unit 103c, in which a signal line 5 electrically coupling the first image-forming main body portion 105a and the second image-forming main body portion 105b extends.

The display element 71 incorporated into the first image-forming main body portion 105a is a self-emitting display device that allows for two-dimensional display, and operates in a dot matrix manner. Specifically, organic electroluminescence (EL) display panels are envisaged for the display elements 71. However, the display elements 71 are by no means limited thereto, and may be panels for liquid crystal display (LCD). When a panel for LCD is used, a matching illumination source is required. The display elements 71 are driven by the first electronic printed wired board 73 to form a color image on a rectangular display surface. The display elements 71 can display a two-dimensional moving image or still image.

Figure 9:
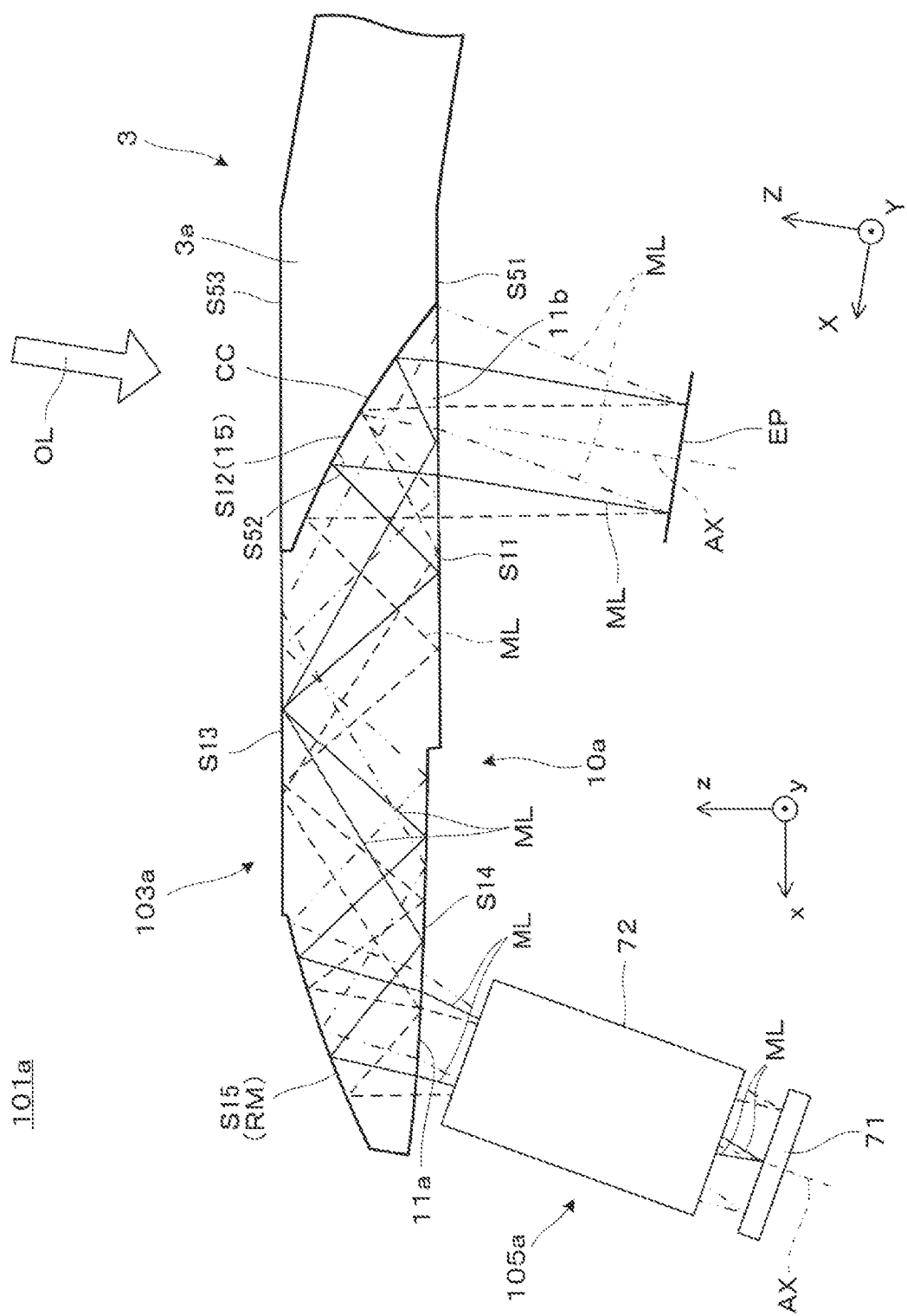
FIG. 9 is a plan view illustrating an optical structure of a first image-forming device.

FIG. 9 is a view illustrating a portion of the first image-forming device 101a. In particular, FIG. 9 illustrates the optical structure of the first virtual image-forming optical unit 103a. As described previously, the wearable image display device (HMD) 100 is constituted by the first image-forming device 101a and the second image-forming device 101b (see FIG. 1 and the like). However, the first image-forming device 101a and the second image-forming device 101b are laterally symmetric and have equivalent structures. Thus, only the first image-forming device 101a will be described, with description of the second image-forming device 101b being omitted. Note that in FIG. 9, x, y, and z represent an orthogonal coordinate system: the x direction and the y direction are parallel to a first surface S11 and a third surface S13; and the z direction is perpendicular to the first surface S11 and the third surface S13.

Of the first virtual image-forming optical unit 103a, the light-guiding member 10a is joined to the light-transmitting portion 3a via an adhesive layer CC. In other words, a second transmission surface S52 of the light-transmitting portion 3a is disposed opposed to a second surface S12 of the light-guiding member 10a, and has the same shape. The light-guiding member 10a and the light-transmitting portion 3a have a structure in which a surface of a main body member that provides a three-dimensional shape including an optical surface is coated with a thin hard coat layer. The main body members of the light-guiding member 10a and the light-transmitting member 3a are formed of a resin material that exhibits high optical transparency in a visible region.

Hereinafter, an overview of the optical path of image light ML will be described. The light-guiding member 10a guides the image light ML emitted from the projection lens 21 toward an eye of the wearer US by reflection or the like at the first to fifth surfaces S11 to S15. Specifically, the image light ML from the projection lens 21 is first incident on a portion of a fourth surface S14 formed in a light-incident portion 11a and is reflected by the fifth surface S15 that is an inner surface of a reflection film RM, is incident again on the fourth surface S14 from the inside and is totally reflected, is incident on the third surface S13 and is totally reflected, and is incident on the first surface S11 and is totally reflected. The image light ML totally reflected by the first surface S11 is incident on the second surface S12, is partially reflected while partially passing through a half mirror 15 provided on the second surface S12, and is incident again on a portion of the first surface S11 formed in a light-emitting portion 11b to pass therethrough. The image light ML that has passed through the first surface S11 travels as a whole along an optical axis AX that is substantially parallel to the Z direction, and is incident on the exit pupil EP at which the eye of the wearer US is disposed as a substantially parallel light flux. In other words, the wearer US observes the image formed by the image light as the virtual image.

The first virtual image-forming optical unit 103a is configured to allow the wearer US to visually recognize the image light ML by the light-guiding member 10a, and to allow the wearer US to observe the outside world image with little distortion with the light-guiding member 10a and the light-transmitting member 3a being combined. At this time, the third surface S13 and the first surface S11 are flat surfaces substantially parallel to each other. Thus, the diopter is substantially 0 for observation performed by seeing through this portion, and aberration or the like is hardly generated for outer light OL. Furthermore, a third transmission surface S53 and a first transmission surface S51 are flat surfaces substantially parallel to each other. Moreover, because the third transmission surface S23 and the first surface S11 are flat surfaces substantially parallel to each other, aberration or the like is hardly generated. In this way, the wearer US observes the outside world image without distortion through the light-transmitting member 3a.

Figure 10:
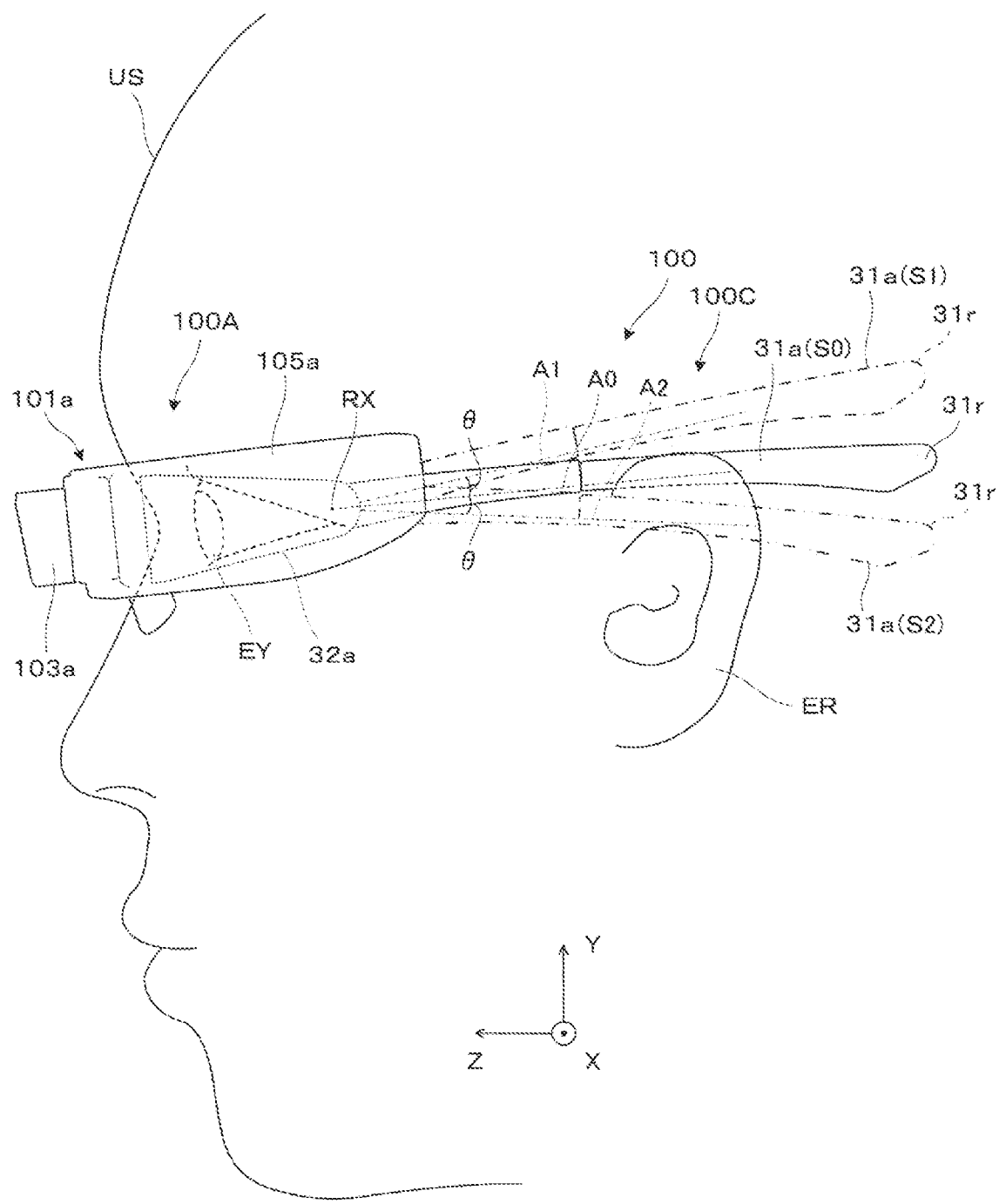
FIG. 10 is a side view illustrating adjustment of the disposition of a temple.

FIG. 10 is a view illustrating angle adjustment or position adjustment of the first temple 100C when wearing the HMD 100. In the first temple 100C, the angular posture of the first extending member 31a relative to the first support member 32a can be set, with the state indicated by a solid line as the standard state S0, to an upper end state S1 in which a rear end portion 31r of the first extending member 31a is displaced counterclockwise upward as indicated by a dot-dash line, and to a lower end state S2 in which the rear end portion 31r of the first extending member 31a is displaced clockwise downward as indicated by a two-dot-dash line. For the first extending member 31a, the standard state S0 can be considered to correspond to the first position in the rotational direction, and the upper end state S1 or the lower end state S2 can be considered to correspond to the second position in the rotational direction. However, this does not necessarily apply. The lower end state S2 may be considered to correspond to the first position in the rotational direction and the upper end state S1 may be considered to correspond to the second position in the rotational direction, and vice versa. As described previously, the angle of the first extending member 31a can be changed in units of 4° with a click feeling. A reference line A1 of the upper end state S1 is raised by two steps from a reference line A0 of the standard state S0, and thus forms an angle θ=−8° therewith. A reference line A2 of the lower end state S2 is lowered by two steps from the reference line A0 of the standard state S0, and thus forms an angle θ=+8° therewith. Here, the angle θ in the clockwise direction when viewed from the outside (+X side) is positive. In this case, the range of the center angle (absolute value) formed between the first position corresponding to the lower end state S2 and the second position, which is the standard state S0, the upper end state S1, or the like, is not less than 4° and not greater than 16°. When the angle θ is approximately ±4°, the raised/lowered amount of the first extending member 31a near the ear ER is approximately ±5 mm. When the angle θ is approximately ±8°, the raised/lowered amount of the first extending member 31a near the ear ER is approximately ±10 mm. As described above, changing the angular posture of the first extending member 31a in a stepwise manner can displace the rear end portion 31r of the first extending member 31a in the vertical direction parallel to the ±Y direction, and adapt the HMD 100 to various wearers US of whom the height of the ears ER relative to the eyes EY varies.

Figure 11:
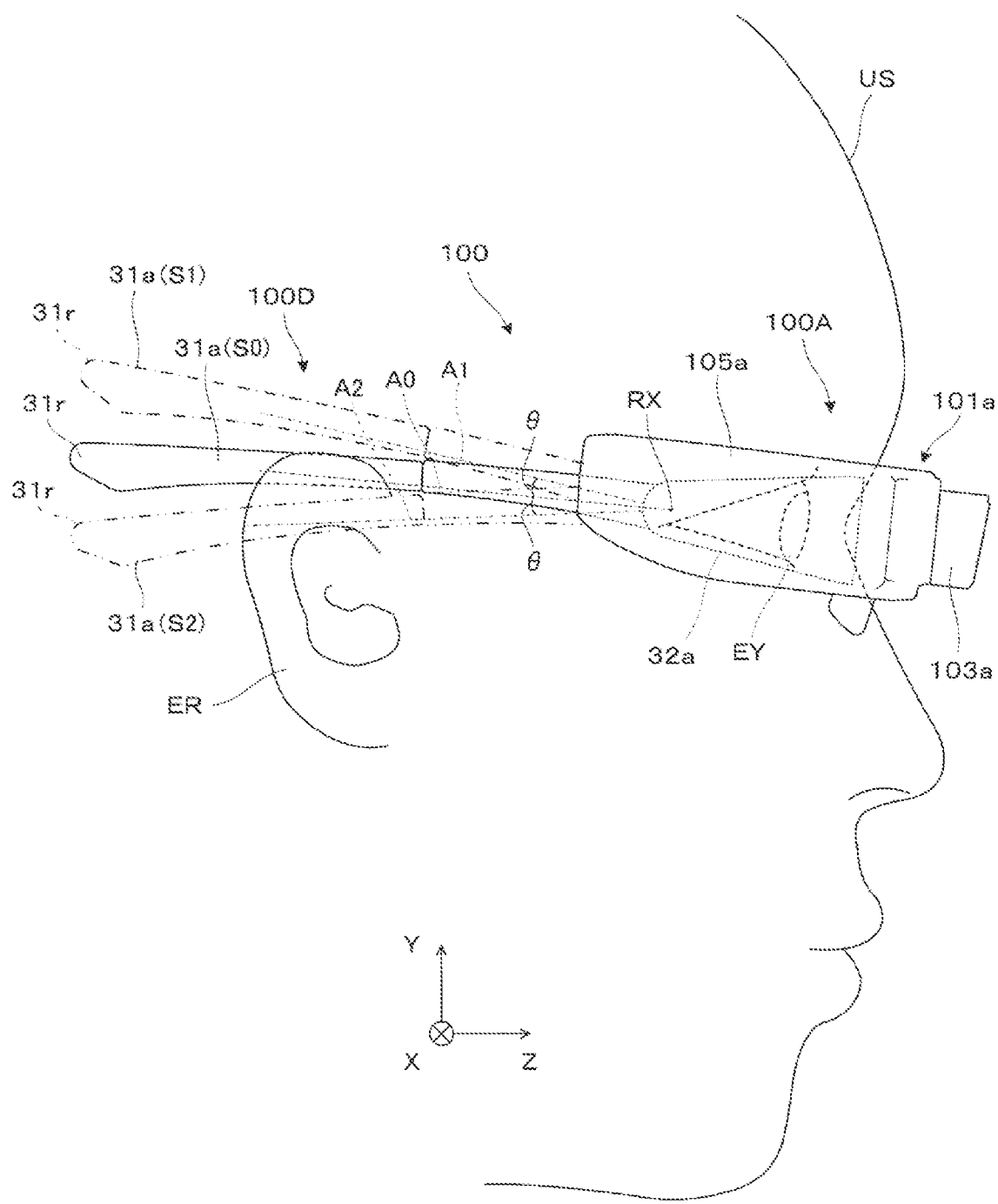
FIG. 11 is a side view illustrating adjustment of the disposition of a temple.

FIG. 11 is a view illustrating angle adjustment or position adjustment of the second temple 100D. Similar to the first temple 100C, the second temple 100D can also be adjusted in angle. Specifically, in the second temple 100D, the angular posture of the second extending member 31b relative to the second support member 32b can be set, with the state indicated by a solid line as the standard state S0, to an upper end state S1 in which a rear end portion 31r of the second extending member 31b is displaced clockwise upward as indicated by a dot-dash line, and to a lower end state S2 in which the rear end portion 31r of the second extending member 31b is displaced counterclockwise downward as indicated by a two-dot-dash line. For the second extending member 31b, the standard state S0 can be considered to correspond to the third position in the rotational direction, and the upper end state S1 or the lower end state S2 can be considered to correspond to the fourth position in the rotational direction. However, this does not necessarily apply. The lower end state S2 may be considered to correspond to the third position in the rotational direction and the upper end state S1 may be considered to correspond to the fourth position in the rotational direction, and vice versa. As described previously, the angle of the second extending member 31b can be changed in units of 4° with a click feeling. A reference line A1 of the upper end state S1 is raised by two steps from a reference line A0 of the standard state S0, and thus forms an angle θ=+8° therewith. A reference line A2 of the lower end state S2 is lowered by two steps from the reference line A0 of the standard state S0, and thus forms an angle θ=−8° therewith. Here, the angle θ in the clockwise direction is positive when viewed from the outside (−X side). In this case, the range of the center angle (absolute value) formed between the third position corresponding to the lower end state S2 and the fourth position, which is the standard state S0, the upper end state S1, or the like, is not less than 4° and not greater than 16°. As described above, changing the angular posture of the second extending member 31b in a stepwise manner can displace the rear end portion 31r of the second extending member 31b in the vertical direction parallel to the ±Y direction, and adapt the HMD 100 to various wearers US of whom the height of the ears ER relative to the eyes EY varies.

Note that the angle state of the second temple 100D can be different from the angle state of the first temple 100C. This makes it possible to increase the adaptability of the HMD 100 to those wearers US whose left and right ears ER differ in height. Here, the range of the center angle (absolute value) formed between the first position corresponding to the lower end state S2 of the first support member 32a and the third position, which is the standard state S0 of the second support member 32b or the like, can be not less than 0° and not greater than 8°, for example. In this case, when the angle state of the second temple 100D and that of the first temple 100C are varied, the range of the center angle (absolute value) formed between the first position corresponding to the lower end state S2 of the first support member 32a and the fourth position, which is the upper end state S1 of the second support member 32b or the like, is not less than 4° and not greater than 16°. When such is the range, the posture of the display device 100A relative to the first temple 100C and the second temple 100D can be adjusted while the angle state of the second temple 100D is made different from the angle state of the first temple 100C. Posture adjustment of the display device 100A will be described in detail later.

In the above description, the nose pad 61 can be replaced or deformed, so the display device 100A can be properly disposed in front of the eyes EY without obstructing observation of the virtual image.

The rotation axis RX of the first extending member 31a and the second extending member 31b may be disposed rearward of (on the −Z side of) the front portion of the eyes EY corresponding to the exit pupil EP, and may be disposed in the rear of the eyes EY. Disposing the rotation axis RX relatively rearward in this manner sufficiently separates the rotation axis RX from the first virtual image-forming optical unit 103a and the like, allowing the stepwise upward/downward movement of the display image to be made gradual and moderate. Making the stepwise upward/downward movement of the display image gradual can suppress the occurrence of a phenomenon in which the display image becomes invisible or missing.

Figure 12:
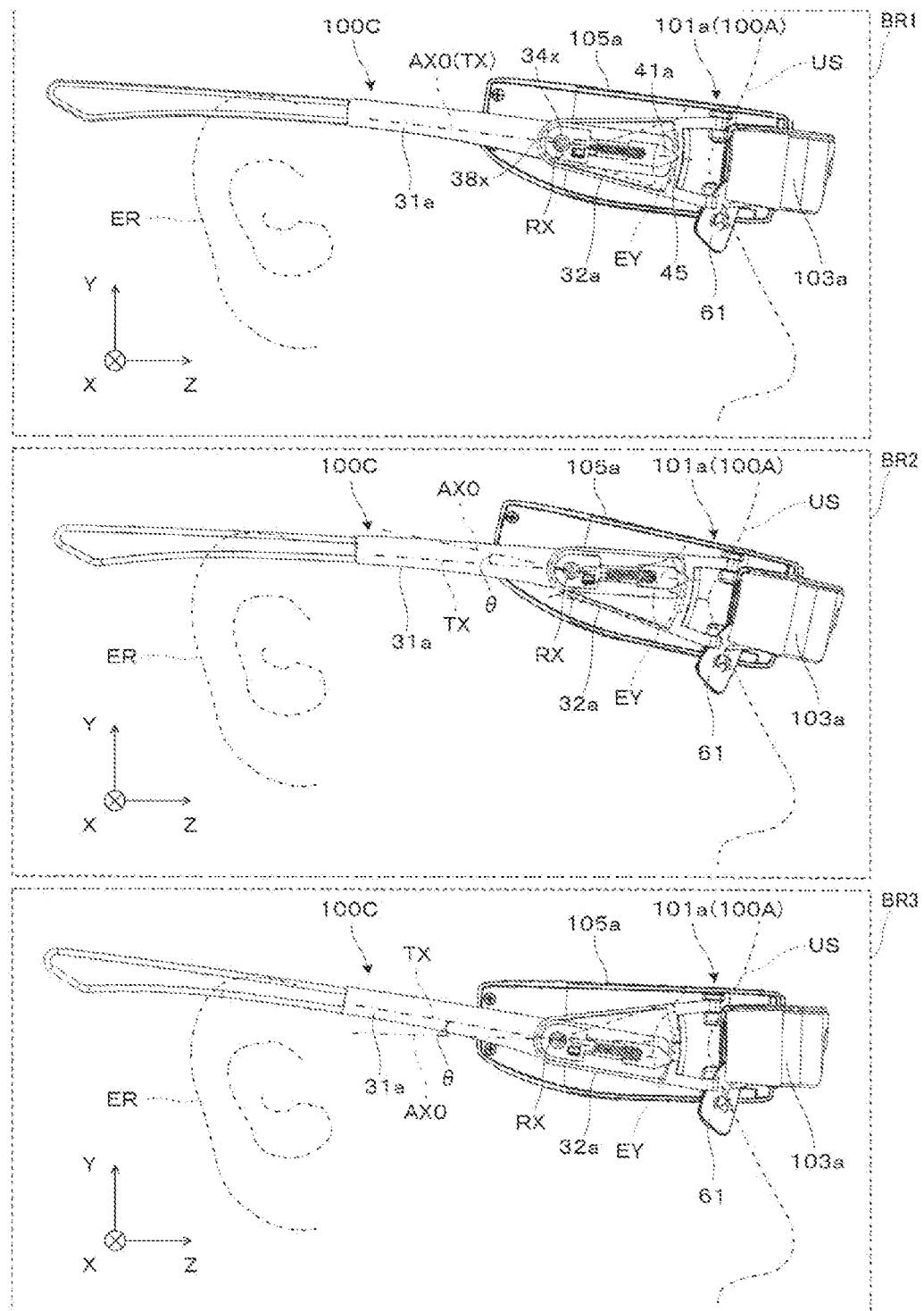
FIG. 12 is a side view illustrating adjustment of the display direction by a display device.

FIG. 12 is a view illustrating posture adjustment of the display device 100A relative to the first temple 100C and the like. In FIG. 12, the first region BR1 illustrates a standard posture of the display device 100A; the second region BR2 illustrates the maximum downward posture of the display device 100A; and the third region BR3 illustrates the maximum upward posture of the display device 100A. In the first region BR1, the optical axis AX0 of the display device 100A is parallel to the reference axis TX of the first extending member 31a of the first temple 100C, and coincides with the standard line-of-sight direction of the wearer US. In the second region BR2, the optical axis AX0 of the display device 100A forms an angle θ=+8° with the reference axis TX of the first extending member 31a of the first temple 100C, and is considerably more downward than the standard line-of-sight direction of the wearer US. In the third region BR3, the optical axis AX0 of the display device 100A forms an angle θ=−8° with the reference axis TX of the first extending member 31a of the first temple 100C, and is considerably more upward than the standard line-of-sight direction of the wearer US. Note that although illustration is omitted, the angle θ can be adjusted in units of 4° within the range of −8° to +8°. As described above, the optical axis AX0 of the display device 100A can be changed in a stepwise manner relative to the reference axis TX of the first extending member 31a. Thus, the direction of the virtual image visible to the wearer US can be moved upward and downward in a stepwise manner, making it possible to adjust height so as to display the image at a height position preferred by the wearer US. Although the above description has not touched on the second temple 100D, the second temple 100D is set to the same state as that of the first temple 100C. However, this does not apply when the left and right ears ER of the wearer US differ in height. For example, when the difference in height between the left and right ears ER corresponds to an angular difference of 8° between the first extending member 31a and the second extending member 31b, the posture adjustment angle of the display device 100A relative to the first temple 100C and the like as described above is 8°.

In the wearable image display device or the HMD 100 according to the first embodiment described above, the first positioning portion 205a and the second positioning portion 206a are brought into contact with each other at the first position and the second position in the rotational direction that are different from each other. Here, the first positioning portion 205a and the second positioning portion 206a are brought into contact with each other either at the first position or at the second position in terms of timing, but are structurally brought into contact with each other both at the first position and at the second position. In other words, in the HMD 100 according to the embodiment, the wearing unit 202 can be set to a plurality of angle states relative to the display unit 201 including a first angle state corresponding to the first position (e.g., the standard state S0 in FIG. 10) and a second angle state corresponding to the second position (e. g., the upper end state S1 in FIGS. 10 and 11), with the angle state of the display unit 201 relative to the wearing unit 20, that is, the disposition of the display unit 201 relative to the ears ER or the eyes EY of the wearer US fixed in a stable state.

Second Embodiment

Hereinafter, a second embodiment of a wearable image display device according to the present disclosure will be described with reference to drawings. The wearable image display device according to the second embodiment is a partial modification to the wearable image display device according to the first embodiment, so description of common parts is omitted.

Figure 13:
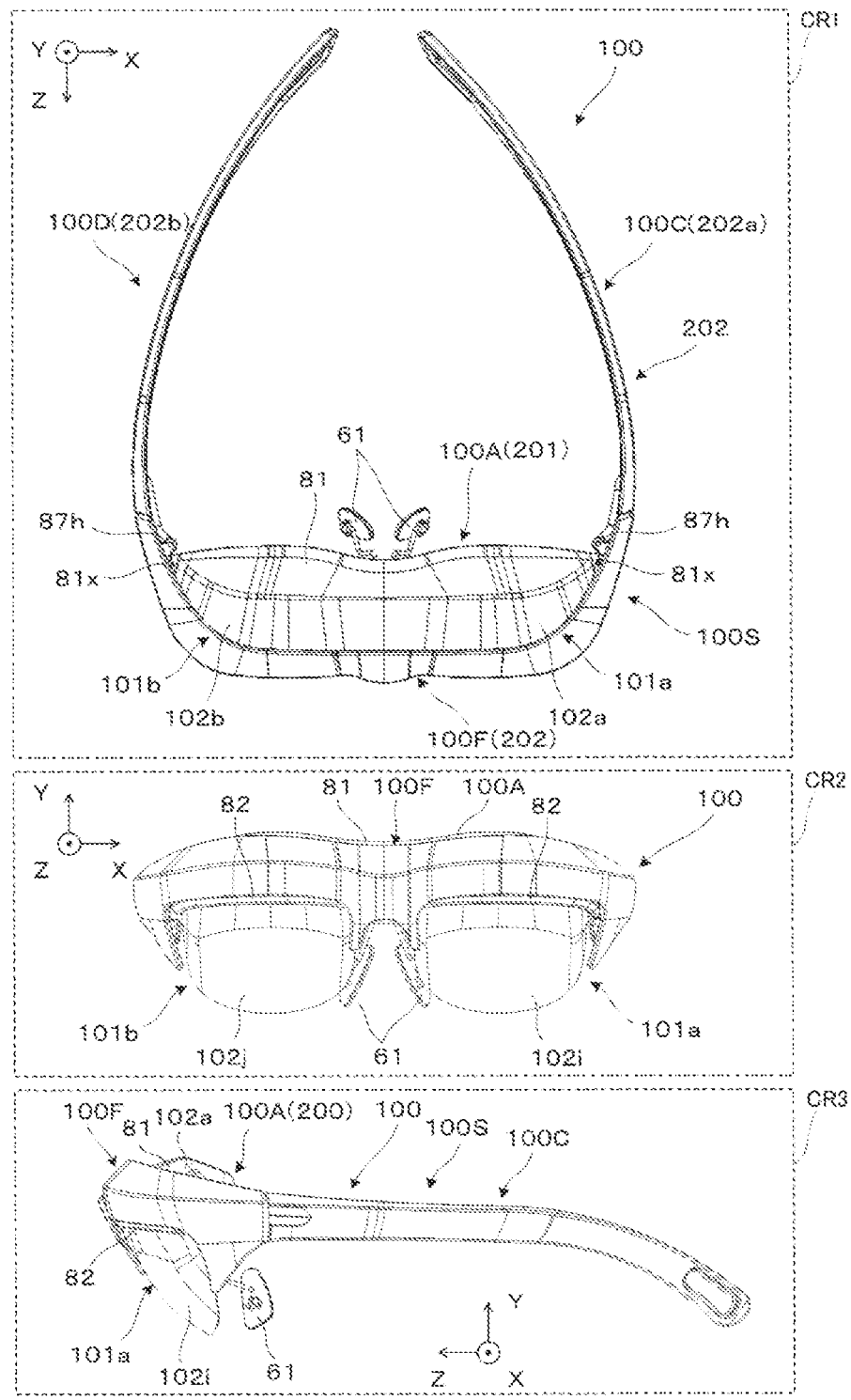
FIG. 13 is a plan view and the like illustrating the appearance of a wearable image display device according to a second embodiment.

FIG. 13 is a view illustrating the appearance of an HMD 100 that is the wearable image display device according to the second embodiment. In FIG. 13, the first region CR1 is a plan view of the HMD 100; the second region CR2 is a front view of the HMD 100; and the third region CR3 is a side view of the HMD 100.

The HMD 100 includes a display device 100A disposed so as to cover the front of the wearer US, and a support device 100S that supports the display device 100A. Functionally speaking, the display device 100A includes a first image-forming device 101a and a second image-forming device 101b. The first image-forming device 100a includes a first display driving unit 102a disposed at an upper portion thereof, and a first combiner 102i that has a spectacle lens shape and that covers the front of the eye. Similarly, the second image-forming device 100b is constituted by a second display driving unit 102b disposed at an upper portion thereof, and a second combiner 102j that has a spectacle lens shape and that covers the front of the eye. The support device 100S includes a main body frame 100F, a first temple 100C, and a second temple 100D. In the above description, the display device 100A is also referred to as the display unit 201, while the support device 100S is also referred to as the wearing unit 202. In the support device 100S, the first temple 100C functions as a first extending member 202a, while the second temple 100D functions as a second extending member 202b.

The first image-forming device 101a and the second image-forming device 101b that constitute the display device 100A are coupled to each other and integrated, and are covered from above by a dome-shaped upper outer packaging member 81 that is elongated in the lateral direction, and from below by a flat plate-shaped lower outer packaging member 82. The first combiner 102i and the second combiner 102j have a hemisphere shape with the upper portion thereof cut off, are supported by the lower outer packaging member 82, and are disposed so as to protrude downward from the lower outer packaging member 82, respectively.

Figure 14:
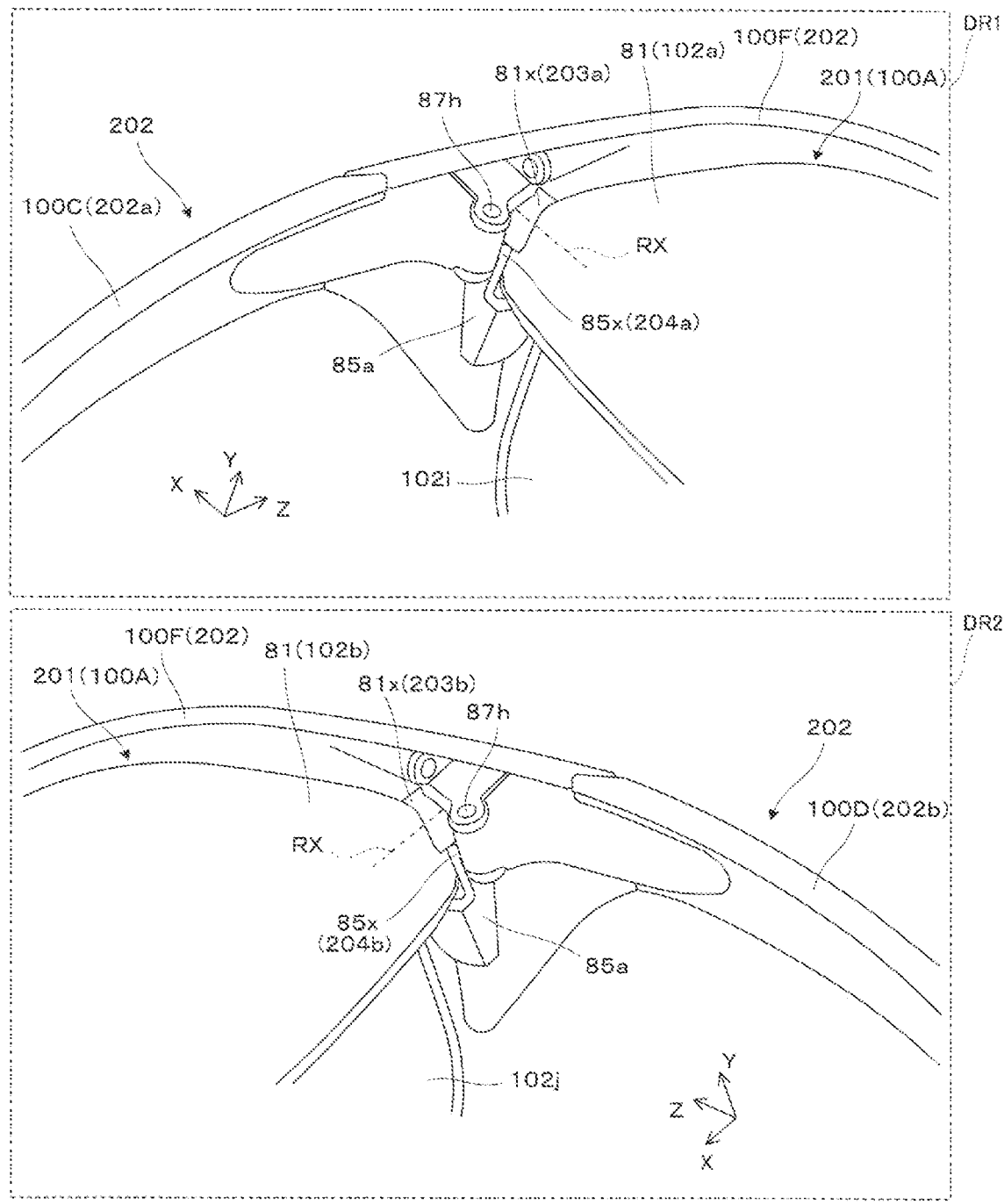
FIG. 14 is a partially enlarged perspective view of a wearable image display device.

FIG. 14 is a partially enlarged perspective view of the HMD 100. In the figure, the first region DR1 illustrates a coupling portion between the display device 100A and the main body frame 100F and the periphery thereof; and the second region DR2 illustrates a coupling portion between the display device 100A and the main body frame 100F and the periphery thereof.

In both ends of the upper outer packaging member 81 of the display device 100A, a pair of shaft portions 81x for support purposes are formed. These shaft portions 81x are rotatably supported by a pair of bearings 85x formed by members 85a fixed to the main body frame 100F of the support device 100S (see FIG. 13). The pair of shaft portions 81x extend in parallel in the X direction. The display device 100A rotates about a rotation axis RX parallel to the X direction, with the shaft portions 81x or the bearings 85x as the center. Furthermore, the first temple 100C and the second temple 100D are collapsibly coupled to the main body frame 100F via a pair of hinges 87h formed by the members 85a fixed to the main body frame 100F. Here, the shaft portion 81x on the first temple 100C side functions as a first rotation mechanism 203a that allows rotation of the first extending member 202a relative to the display unit 201, that is, rotation of the display unit 201 relative to the first extending member 202a or the wearing unit 202. The bearing 85x on the first temple 100C side functions as a first fitting mechanism 204a fitted to the shaft portion 81x that is the first rotation mechanism 203a. On the other hand, the shaft portion 81x on the second temple 100D side functions as a second rotation mechanism 203b that allows rotation of the second extending member 202b relative to the display unit 201, that is, rotation of the display unit 201 relative to the second extending member 202b or the wearing unit 202. The bearing 85x on the second temple 100D side functions as a second fitting mechanism 204b fitted to the shaft portion 81x that is the second rotation mechanism 203b.

Figure 15:
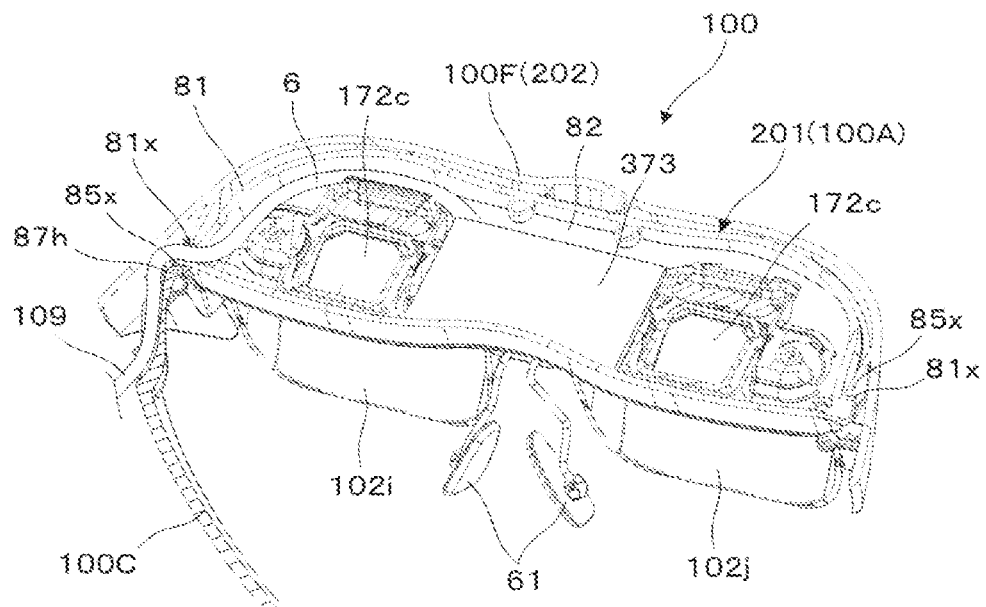
FIG. 15 is a view illustrating a cross section of a wearable image display device.

FIG. 15 is a view illustrating a cross section substantially parallel to the XZ plane of the HMD 100. In the display device 100A, one shaft portion 81x is hollow. Wiring 6 extending from an electronic printed wired board 373 housed in the display device 100A passes inside the shaft portion 81x supported by the bearing 85x, extending to the first temple 100C and being drawn out to the outside as a cable 109.

Figure 16:
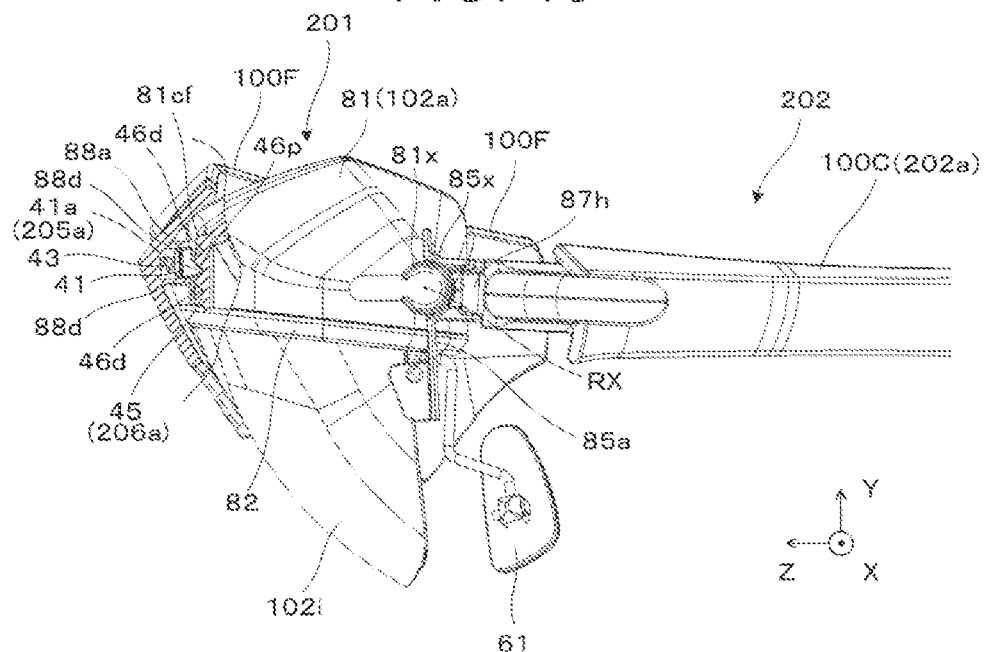
FIG. 16 is a partially cutaway cross-sectional view illustrating an angle adjustment mechanism.

FIG. 16 is a partially cutaway cross-sectional view illustrating an angle adjustment mechanism incorporated between the display unit 201 and the wearing unit 202, in which the cutaway cross section is marked by a diagonal hatching pattern. At the center in the lateral direction (±X direction) of the upper outer packaging member 81, in a front portion 81cf on the +Z side, there is formed a ratchet tooth member 45 extending substantially parallel to the XY plane. In a depression on the −Z side, that is, on the back surface side of the central portion 88a of the main body frame 100F, there is formed a support frame 88d extending in the −Z direction. This support frame 88d holds a sliding member 41, with a spring 43 sandwiched between the bottom of the support frame 88d and the sliding member 41. In the ratchet tooth member 45, there are formed three recesses 46d aligned in the vertical direction. The protrusion 46p of the ratchet pawl 41a formed in the sliding member 41 of the main body frame 100F engages with any of the recesses 46d. Applying a force greater than or equal to a predetermined magnitude for rotating the wearing unit 202 about the rotation axis RX relative to the display unit 201 causes the protrusion 46p of the ratchet pawl 41a to move upward or downward in a stepwise manner to any of the recesses 46d while being fitted to recesses 46d along the ratchet tooth member 45. This causes the angular posture of the display unit 201 relative to the first extending member 202a or the second extending member 202b, that is, the angular posture of the display unit 201 relative to the wearing unit 202 to change in a stepwise manner, for example, in predetermined angle units of 4°. In the above description, the ratchet pawl 41a is a first positioning portion 205a, which is one member for adjusting the angle of the wearing unit 202 relative to the display unit 201. The ratchet pawl 41a is provided with a protrusion 46p, which is brought into contact with any of a plurality of recesses 46d of the ratchet tooth member 45. Furthermore, the ratchet tooth member 45 is a second positioning portion 206a, which is the other member for adjusting the angle of the wearing unit 202 relative to the display unit 201. The protrusion 46p of the ratchet pawl 41a is brought into contact with any of the plurality of recesses 46d.

Figure 17:
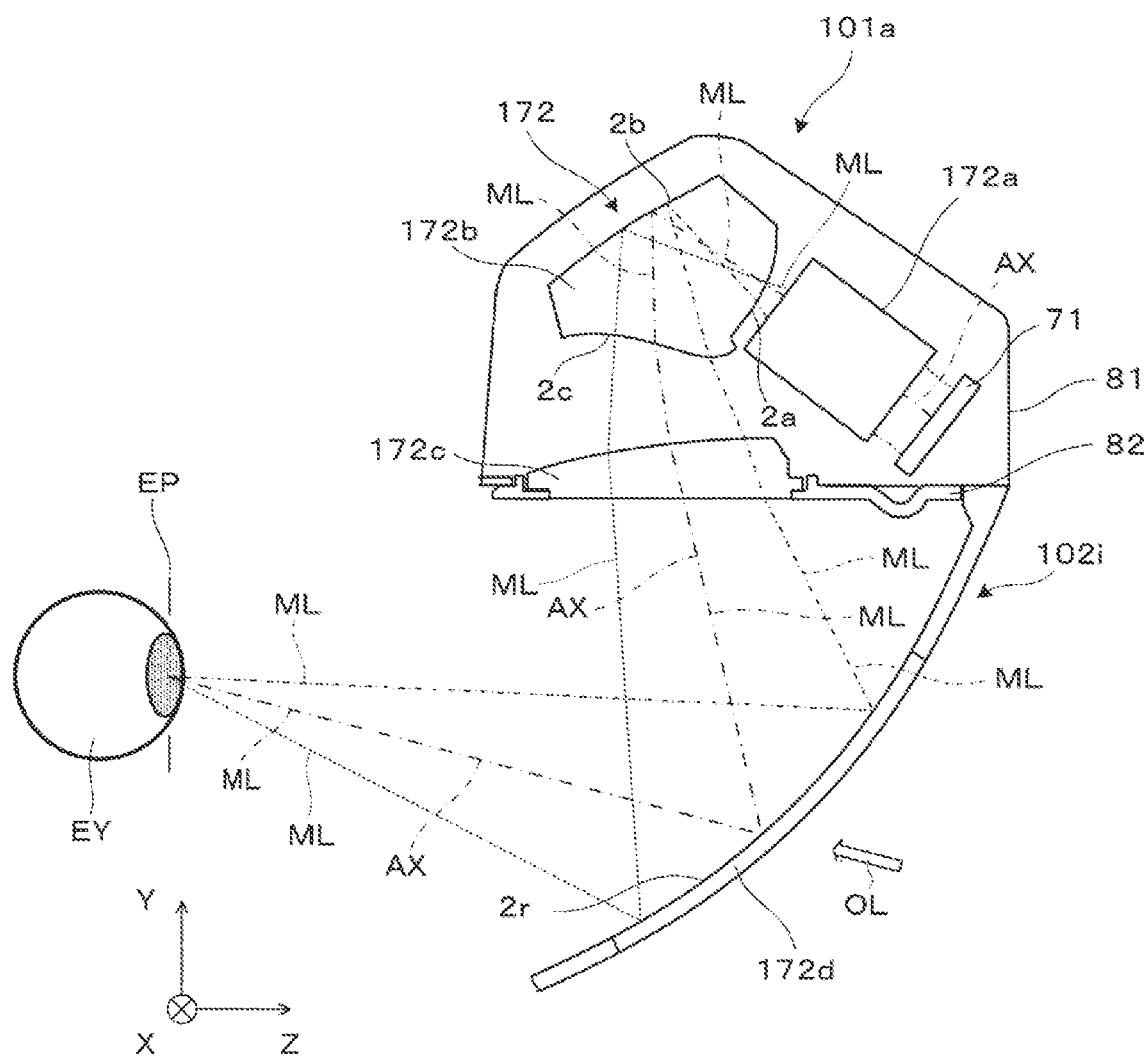
FIG. 17 is a side cross-sectional view illustrating an optical structure of the first image-forming device.

FIG. 17 is a side cross-sectional view illustrating an optical structure of the first image-forming device 101a. The first image-forming device 101a includes a display element 71 and an imaging optical system 172. The imaging optical system 172 includes a projection lens 172a, a prism mirror 172b, a wedge-shaped optical element 172c, and a see-through mirror 172d. Of the imaging optical system 172, the see-through mirror 172d corresponds to the first combiner 102i. Note that the optical structure of the second image-forming device 101b is the same as the optical structure of the first image-forming device 101a, so description thereof is omitted.

To describe the optical path, the image light ML from the display element 71 is incident on the projection lens 172a, and is emitted from the projection lens 172a in a substantially collimated state. The image light ML that has passed through the projection lens 172a is incident on the prism mirror 172b, passes through an incident surface 2a while being refracted thereby, is reflected by an inner reflection surface 2b with a high reflectance close to 100%, and is refracted again by a light emission surface 2c. The image light ML from the prism mirror 172b is incident on the see-through mirror 172d via the wedge-shaped optical element 172c, and is reflected by an inner reflection surface 2r with a predetermined reflectance. The image light ML reflected by the see-through mirror 172d is incident on the exit pupil EP at which the eye EY of the wearer US is disposed. The outer light OL that has passed through the see-through mirror 172d is also incident on the exit pupil EP.

In the wearable image display device or the HMD 100 according to the second embodiment described above, a single second positioning portion 206a is disposed away from the first rotation mechanism 203a and the second rotation mechanism 203b, which makes it easy to adjust the angle of the display unit 201 relative to the wearing unit 202.

Modified Examples and Others

The present disclosure has been described based on the embodiments described above. However, the present disclosure is by no means limited to the embodiments described above. The present disclosure can be carried out in various modes without departing from the gist of the present disclosure. Thus, for example, the following modifications can also be carried out.

In the embodiments described above, the ratchet pawl 41a is formed in the wearing unit 202, and the ratchet tooth member 45 is formed in the display unit 201. However, the ratchet tooth member 45 may be formed in the wearing unit 202, and the ratchet pawl 41a may be formed in the display unit 201. In other words, the protrusion 46p and the recesses 46d can be interchangeably disposed.

In the embodiments described above, the shaft portions 81x can be provided in the display unit 201, and the bearings 85x can be provided in the wearing unit 202. The bearing 85x and the like are not limited to those illustrated, and can have various structures.

The pitch units of the angle θ of the first extending member 31a and the second extending member 31b are not limited to 4°, and can vary depending on the application. The upper limit value is not limited to ±8° either, and can vary depending on the application.

The first image-forming device 101a and the second image-forming device 101b are not limited to the illustrated optical systems, and can be optical systems including various optical elements.

A dimming device for performing dimming by restricting incident light to the virtual image-forming optical units 103a and 103b can be attached on the outside world side of the virtual image-forming optical units 103a and 103b and the combiners 102i and 102j. The dimming device adjusts transmittance, for example, electrically. Mirror liquid crystals, electronic shades, and the like can be used as the dimming device. The dimming device may be those that adjust transmittance in accordance with outer light brightness.

The combiners 102i and 102j can also be replaced with mirrors having light-blocking properties. In this case, a non-see-through type optical system is obtained that does not assume direct observation of the outside world image.

A wearable image display device according to a specific aspect includes: a display unit configured to form an image; and a wearing unit attached to the display unit; wherein the display unit includes a first positioning portion and a first rotation mechanism configured to rotate relative to the wearing unit in a rotational direction with a first direction serving as a rotation axis, the wearing unit includes a second positioning portion brought into contact with the first positioning portion and a first fitting mechanism fitted to the first rotation mechanism, and the first positioning portion and the second positioning portion are brought into contact with each other either at a first position or at a second position different from the first position in the rotational direction.

In the wearable image display device described above, the first positioning portion and the second positioning portion are brought into contact with each other at a first position and a second position in the rotational direction. Thus, the wearing unit can be set to a plurality of angle states relative to the display unit including a first angle state corresponding to the first position and a second angle state corresponding to the second position, with the angle state of the display unit relative to the wearing unit, that is, the disposition of the display unit relative to the ears or eyes of the wearer fixed in a stable state.

In a specific aspect, the first position is a position on a first rotational direction side in the rotational direction, the second position is a position on a second rotational direction side in a direction opposite to the first rotational direction, the first positioning portion is provided with one of a recess or a protrusion, the second positioning portion is provided with the other of the recess or the protrusion, the one provided in the first positioning portion is brought into contact, at the first position, with the other provided in the second positioning portion when the display unit is rotated to the first rotational direction side, and the one provided in the first positioning portion is brought into contact, at the second position, with the other provided in the second positioning portion when the display unit is rotated to the second rotational direction side. In this case, the first positioning portion and the second positioning portion can be easily and reliably positioned by the fitting of a recess and a protrusion.

In a specific aspect, the first position is a position on a first rotational direction side in the rotational direction, the second position is a position different from the first position in the first rotational direction, the first positioning portion is provided with one of a recess or a protrusion, and the second positioning portion is provided with the other of the recess or the protrusion.

In a specific aspect, a range of a center angle formed between the first position and the second position about the rotation axis in the first direction is not less than 4° and not greater than 16°. In this case, in response to a change from the first position to the second position, the angular posture of the display unit relative to the wearing unit can be changed in a range of not less than 4° and not greater than 16°.

In a specific aspect, the wearing unit includes a first extending member extending in a second direction different from the first direction, the display unit includes a first support member to which the first extending member is attached, the first support member is provided with the first rotation mechanism and the first positioning portion, and the first extending member is provided with the first fitting mechanism and the second positioning portion. In this case, the angle state of the display unit relative to the wearing unit can be adjusted while positioning and fitting the first extending member and the first support member to each other.

In a specific aspect, the first rotation mechanism is a shaft portion with the first direction serving as an axial direction, the first fitting mechanism is a bearing portion fitted to the shaft portion, the first extending member is provided with an opening portion opening in the second direction, and in the first extending member, a bearing member including the bearing portion, a positioning member including the second positioning portion, and an elastic member provided between the bearing member and the positioning member are provided in the opening portion. In this case, the second positioning member can be elastically displaced relative to the bearing member by the elastic member, and the second positioning portion can be biased and fixed to the first positioning portion with an appropriate force. With such a structure, the structures of the first extending member and the first support member can be made thin and small.

In a specific aspect, the wearing unit includes a second extending member that extends in the second direction and that is different from the first extending member, the display unit includes a third positioning member and a second support member to which the second extending member is attached, the first support member is provided on one side in the first direction of the display unit, the second support member is provided on the other side in the first direction of the display unit, the second support member includes a second rotation mechanism configured to rotate relative to the wearing unit in the rotational direction with the first direction serving as the rotation axis, the second extending member includes a second fitting mechanism fitted to the second rotation mechanism and a fourth positioning portion brought into contact with the third positioning portion in the rotational direction, and the third positioning portion and the fourth positioning portion are brought into contact with each other either at a third position or at a fourth position different from the third position in the rotational direction. In this case, the first extending member of the wearing unit is supported via the first support member of the display unit, and the second extending member of the wearing unit is supported via the second support member of the display unit. Thus, the first support member of the wearing unit can be set to a plurality of angle states relative to the display unit, and the second support member of the wearing unit can be set to a plurality of angle states relative to the display unit.

In a specific aspect, the third positioning portion is provided with one of a recess or a protrusion, the fourth positioning portion is provided with the other of the recess or the protrusion, the one provided in the third positioning portion is brought into contact, at the third position, with the other provided in the fourth positioning portion when the display unit is rotated to the first rotational direction side, the one provided in the third positioning portion is brought into contact with the other provided in the fourth positioning portion at the fourth position when the display unit is rotated to the second rotational direction side, a range of a center angle formed between the first position and the third position about the rotation axis in the first direction is not less than 0° and not greater than 8°, and a range of a center angle formed between the first position and the fourth position about the rotation axis in the first direction is not less than 0° and not greater than 16°. In this case, the relative angle between the first support member of the wearing unit and the second support member of the wearing unit can be in a range of not less than 0° and not greater than 8° at the minimum, and can be in a range of not less than 0° and not greater than 16° at the maximum.

In a specific aspect, the display unit includes a second rotation mechanism configured to rotate relative to the wearing unit in the rotational direction, the first rotation mechanism is provided on one side, in the first direction, of the display unit, the second rotation mechanism is provided on the other side, in the first direction, of the display unit, the wearing unit includes a second fitting mechanism fitted to the second rotation mechanism, a first extending member extending in a second direction different from the first direction, and a second extending member extending in the second direction, the first fitting mechanism and the first extending member are each provided on one side, in the first direction, of the wearing unit, the second fitting mechanism and the second extending member are each provided on the other side, in the first direction, of the wearing unit, and the second positioning portion is provided between the first fitting mechanism and the second fitting mechanism of the wearing unit,. In this case, a single second positioning portion is disposed away from the first rotation mechanism and the second rotation mechanism.

What is claimed is:

1. A wearable image display device comprising:
   a display unit that displays an image; and
   a wearing unit attached to the display unit; wherein
   the display unit includes a first positioning portion and a first rotation mechanism that rotates relative to the wearing unit in a rotational direction with a first direction serving as a rotation axis,
   the wearing unit includes a second positioning portion brought into contact with the first positioning portion and a first fitting mechanism fitted to the first rotation mechanism,
   the first positioning portion and the second positioning portion are brought into contact with each other either at a first position or at a second position different from the first position in the rotational direction, and
   a range of a center angle formed between the first position and the second position about the rotation axis in the first direction is not less than 4° and not greater than 16°.

2. The wearable image display device according to claim 1, wherein
   the first position is a position on a first rotational direction side in the rotational direction,
   the second position is a position on a second rotational direction side in a direction opposite to the first rotational direction,
   the first positioning portion is provided with one of a recess or a protrusion,
   the second positioning portion is provided with the other of the recess or the protrusion,
   the one of the recess or the protrusion provided in the first positioning portion is brought into contact, at the first position, with the other of the recess or the protrusion provided in the second positioning portion when the display unit is rotated to the first rotational direction side, and
   the one of the recess or the protrusion provided in the first positioning portion is brought into contact, at the second position, with the other of the recess or the protrusion provided in the second positioning portion when the display unit is rotated to the second rotational direction side.

3. The wearable image display device according to claim 1, wherein
   the first position is a position on a first rotational direction side in the rotational direction,
   the second position is a position different from the first position in the first rotational direction,
   the first positioning portion is provided with one of a recess or a protrusion, and
   the second positioning portion is provided with the other of the recess or the protrusion.

4. The wearable image display device according to claim 1, wherein
   the wearing unit includes a first extending member extending in a second direction different from the first direction,
   the display unit includes a first support member to which the first extending member is attached,
   the first support member is provided with the first rotation mechanism and the first positioning portion, and
   the first extending member is provided with the first fitting mechanism and the second positioning portion.

5. The wearable image display device according to claim 4, wherein
   the first rotation mechanism is a shaft portion with the first direction serving as an axial direction,
   the first fitting mechanism is a bearing portion fitted to the shaft portion,
   the first extending member is provided with an opening portion opening in the second direction, and
   a bearing member including the bearing portion, a positioning member including the second positioning portion, and an elastic member provided between the bearing member and the positioning member are provided in the opening portion of the first extending member.

6. The wearable image display device according to claim 4, wherein
   the wearing unit includes a second extending member that extends in the second direction and that is different from the first extending member,
   the display unit includes a third positioning member and a second support member to which the second extending member is attached, the first support member is provided on one side, in the first direction, of the display unit, the second support member is provided on the other side, in the first direction, of the display unit, the second support member includes a second rotation mechanism that rotates relative to the wearing unit in the rotational direction with the first direction serving as the rotation axis, the second extending member includes a second fitting mechanism fitted to the second rotation mechanism and a fourth positioning portion brought into contact with the third positioning portion in the rotational direction, and the third positioning portion and the fourth positioning portion are brought into contact with each other either at a third position or at a fourth position different from the third position in the rotational direction.

7. The wearable image display device according to claim 6, wherein the third positioning portion is provided with one of a recess or a protrusion, the fourth positioning portion is provided with the other of the recess or the protrusion, the one of the recess or the protrusion provided in the third positioning portion is brought into contact, at the third position, with the other of the recess or the protrusion provided in the fourth positioning portion when the display unit is rotated to the first rotational direction side, the one of the recess or the protrusion provided in the third positioning portion is brought into contact, at the fourth position, with the other of the recess or the protrusion provided in the fourth positioning portion when the display unit is rotated to the second rotational direction side, a range of a center angle formed between the first position and the third position about the rotation axis in the first direction is not less than 0° and not greater than 8°, and a range of a center angle formed between the first position and the fourth position about the rotation axis in the first direction is not less than 0° and not greater than 16°.

8. The wearable image display device according to claim 1, wherein the display unit includes a second rotation mechanism that rotates relative to the wearing unit in the rotational direction, the first rotation mechanism is provided on one side, in the first direction, of the display unit, the second rotation mechanism is provided on the other side, in the first direction, of the display unit, the wearing unit includes a second fitting mechanism fitted to the second rotation mechanism, a first extending member extending in a second direction different from the first direction, and a second extending member extending in the second direction, the first fitting mechanism and the first extending member are each provided on one side, in the first direction, of the wearing unit, the second fitting mechanism and the second extending member are each provided on the other side, in the first direction, of the wearing unit, and the second positioning portion is provided between the first fitting mechanism and the second fitting mechanism of the wearing unit.

* * * * *